US011164159B2

(12) United States Patent
Ma et al.

(10) Patent No.: US 11,164,159 B2
(45) Date of Patent: Nov. 2, 2021

(54) SMART BUILDING AUTOMATION SYSTEM WITH DIGITAL SIGNAGE

(71) Applicant: Johnson Controls Tyco IP Holdings LLP, Milwaukee, WI (US)

(72) Inventors: Ada L. Ma, Kenmore, WA (US); Sudhi R. Sinha, Milwaukee, WI (US); Erik S. Paulson, Madison, WI (US); Elyse R. Hobson, Milwaukee, WI (US); Youngchoon Park, Brookfield, WI (US); Justin J. Ploegert, Cudahy, WI (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 0 days.

(21) Appl. No.: 16/746,074

(22) Filed: Jan. 17, 2020

(65) Prior Publication Data
US 2020/0233680 A1 Jul. 23, 2020

Related U.S. Application Data

(60) Provisional application No. 62/794,407, filed on Jan. 18, 2019, provisional application No. 62/794,389, (Continued)

(51) Int. Cl.
*G06Q 10/10* (2012.01)
*G06Q 30/06* (2012.01)
(Continued)

(52) U.S. Cl.
CPC ......... *G06Q 10/1095* (2013.01); *G05B 15/02* (2013.01); *G05B 19/042* (2013.01);
(Continued)

(58) Field of Classification Search
CPC ......... G06Q 10/1095; G06Q 10/06398; G06Q 10/087; G06Q 10/10; G06Q 30/0633;
(Continued)

(56) References Cited

U.S. PATENT DOCUMENTS 7,552,467 B2 * 6/2009 Lindsay .................. G06F 21/31
726/5
8,180,663 B2 5/2012 Tischhauser et al.
(Continued)

FOREIGN PATENT DOCUMENTS

| CN | 105841293 | 8/2016 |
| JP | 2008-310533 A | 12/2008 |

(Continued)

OTHER PUBLICATIONS

Hipla, "Visitor Management: Smart Solutions to visitors, saving time and maximizing productivity," URL: https://hipla.io/visitor-management.html, retrieved from internet Mar. 3, 2021, 3 pages.
(Continued)

*Primary Examiner* — William D Titcomb
(74) *Attorney, Agent, or Firm* — Foley & Lardner LLP

(57) ABSTRACT

One or more non-transitory computer-readable storage mediums having instructions stored thereon that, when executed by one or more processors, cause the one or more processors to receive, from a sensor, identifying information associated with an individual, query a database to retrieve context information corresponding to the individual, the database comprising a number of entities corresponding to two or more of spaces, equipment, people, or events and a number of relationships between the entities, the context information determined based on the entities and relationships of the database, determine a purpose of the individual based on the context information, dynamically generate a user interface element for a display based on the purpose of
(Continued)

the individual, and control the display to display the user interface element.

20 Claims, 8 Drawing Sheets

Related U.S. Application Data filed on Jan. 18, 2019, provisional application No. 62/794,348, filed on Jan. 18, 2019, provisional application No. 62/794,393, filed on Jan. 18, 2019, provisional application No. 62/794,502, filed on Jan. 18, 2019, provisional application No. 62/794,535, filed on Jan. 18, 2019, provisional application No. 62/794,032, filed on Jan. 18, 2019, provisional application No. 62/794,370, filed on Jan. 18, 2019, provisional application No. 62/794,533, filed on Jan. 18, 2019, provisional application No. 62/794,489, filed on Jan. 18, 2019, provisional application No. 62/794,415, filed on Jan. 18, 2019, provisional application No. 62/794,357, filed on Jan. 18, 2019, provisional application No. 62/794,276, filed on Jan. 18, 2019.

(51) Int. Cl.

| | | |
|---|---|---|
| *G06F 9/451* | (2018.01) | |
| *G06F 16/28* | (2019.01) | |
| *G06F 16/248* | (2019.01) | |
| *G06F 16/25* | (2019.01) | |
| *H04L 9/32* | (2006.01) | |
| *G07C 9/37* | (2020.01) | |
| *G06K 9/00* | (2006.01) | |
| *G07C 9/00* | (2020.01) | |
| *G05B 15/02* | (2006.01) | |
| *G05B 19/042* | (2006.01) | |
| *G05B 23/02* | (2006.01) | |
| *G06Q 10/08* | (2012.01) | |
| *G06F 16/901* | (2019.01) | |
| *G06Q 10/06* | (2012.01) | |
| *G08G 1/14* | (2006.01) | |
| *G07C 9/27* | (2020.01) | |
| *G07C 9/21* | (2020.01) | |
| *G07C 9/20* | (2020.01) | |
| *G07C 9/22* | (2020.01) | |
| *G07C 9/23* | (2020.01) | |
| *G07C 9/25* | (2020.01) | |
| *G07C 9/28* | (2020.01) | |
| *G06Q 50/26* | (2012.01) | |

(52) U.S. Cl.
CPC ......... *G05B 23/0218* (2013.01); *G06F 9/451* (2018.02); *G06F 16/248* (2019.01); *G06F 16/252* (2019.01); *G06F 16/288* (2019.01); *G06F 16/9024* (2019.01); *G06K 9/00369* (2013.01); *G06K 9/00771* (2013.01); *G06K 9/00812* (2013.01); *G06Q 10/06398* (2013.01); *G06Q 10/087* (2013.01); *G06Q 10/10* (2013.01); *G06Q 30/0633* (2013.01); *G07C 9/00563* (2013.01); *G07C 9/21* (2020.01); *G07C 9/215* (2020.01); *G07C 9/22* (2020.01); *G07C 9/23* (2020.01); *G07C 9/253* (2020.01); *G07C 9/27* (2020.01); *G07C 9/28* (2020.01); *G07C 9/37* (2020.01); *G08G 1/142* (2013.01); *G08G 1/148* (2013.01); *G08G 1/149* (2013.01); *H04L 9/3247* (2013.01); *G05B 2219/25011* (2013.01); *G06K 2209/15* (2013.01); *G06Q 50/26* (2013.01)

(58) Field of Classification Search
CPC ...... G06F 9/451; G06F 16/258; G06F 16/252; G06F 16/9024; G07C 9/37; G07C 9/00563; G05B 15/02; G05B 19/042; G05B 23/0218; G06K 9/00369; G06K 9/00771; G06K 9/00812; G08G 1/142; G08G 1/148; G08G 1/149; H04L 9/3247
USPC ....................................................... 715/745
See application file for complete search history.

(56) References Cited

U.S. PATENT DOCUMENTS

| | | | |
|---|---|---|---|
| 8,346,589 B1 | 1/2013 | Norton et al. | |
| 8,629,755 B2 | 1/2014 | Hashim-Waris | |
| 8,907,803 B2 | 12/2014 | Martin | |
| 9,202,322 B2 | 12/2015 | Kappeler et al. | |
| 9,576,255 B2 | 2/2017 | Kalb et al. | |
| 9,666,075 B2 | 5/2017 | Davies et al. | |
| 9,955,318 B1 | 4/2018 | Scheper et al. | |
| 10,154,138 B2 | 12/2018 | Booij et al. | |
| 10,380,854 B1* | 8/2019 | Yu | G08B 3/10 |
| 10,505,756 B2 | 12/2019 | Park et al. | |
| 2003/0150908 A1 | 8/2003 | Pokorny et al. | |
| 2003/0158795 A1 | 8/2003 | Markham et al. | |
| 2006/0015376 A1 | 1/2006 | Sattler et al. | |
| 2006/0227010 A1 | 10/2006 | Berstis et al. | |
| 2007/0250417 A1 | 10/2007 | Lane et al. | |
| 2007/0250920 A1* | 10/2007 | Lindsay | G07F 7/1025 |
| | | | 726/7 |
| 2008/0263467 A1* | 10/2008 | Wilkins | G06F 40/12 |
| | | | 715/765 |
| 2010/0128931 A1 | 5/2010 | Bongard | |
| 2011/0054968 A1 | 3/2011 | Galaviz | |
| 2011/0184943 A1 | 7/2011 | Norton et al. | |
| 2012/0112929 A1 | 5/2012 | Gupta et al. | |
| 2012/0143356 A1* | 6/2012 | Berg-Sonne | G05B 15/02 |
| | | | 700/49 |
| 2012/0310852 A1 | 12/2012 | Ramalingamoorthy et al. | |
| 2012/0323643 A1 | 12/2012 | Volz | |
| 2013/0173062 A1* | 7/2013 | Koenig-Richardson | |
| | | | G05B 15/02 |
| | | | 700/275 |
| 2013/0226320 A1* | 8/2013 | Berg-Sonne | G05D 23/1902 |
| | | | 700/90 |
| 2014/0334684 A1 | 11/2014 | Strimling | |
| 2014/0358285 A1* | 12/2014 | Aggarwal | G05B 15/02 |
| | | | 700/275 |
| 2015/0066716 A1 | 3/2015 | Shortridge | |
| 2015/0138001 A1 | 5/2015 | Davies et al. | |
| 2015/0156030 A1* | 6/2015 | Fadell | G06Q 10/063 |
| | | | 700/90 |
| 2015/0156031 A1* | 6/2015 | Fadell | G08B 19/005 |
| | | | 700/276 |
| 2015/0220942 A1 | 8/2015 | Dubberley | |
| 2015/0310682 A1 | 10/2015 | Arora et al. | |
| 2016/0134432 A1* | 5/2016 | Hund | H04L 12/2816 |
| | | | 709/225 |
| 2016/0171785 A1* | 6/2016 | Banatwala | G08G 1/146 |
| | | | 705/13 |
| 2017/0372271 A1 | 12/2017 | Goldsmith et al. | |
| 2018/0005495 A1 | 1/2018 | Hieb | |
| 2018/0018508 A1* | 1/2018 | Tusch | G06K 9/00771 |
| 2018/0211539 A1 | 7/2018 | Boss et al. | |
| 2018/0268238 A1 | 9/2018 | Khan et al. | |
| 2018/0275625 A1 | 9/2018 | Park et al. | |
| 2018/0308475 A1* | 10/2018 | Locke | G06F 40/279 |
| 2019/0017719 A1 | 1/2019 | Sinha et al. | |
| 2019/0065014 A1* | 2/2019 | Richter | G06F 9/451 |
| 2019/0096147 A1* | 3/2019 | Park | G07C 9/257 |
| 2019/0122050 A1 | 4/2019 | Beals et al. | |
| 2019/0130365 A1 | 5/2019 | Pell et al. | |
| 2019/0158309 A1 | 5/2019 | Park et al. | |
| 2019/0172165 A1* | 6/2019 | Verteletskyi | G06Q 50/163 |

(56) References Cited

U.S. PATENT DOCUMENTS

2019/0361852 A1\* 11/2019 Rogynskyy ........... G06F 16/235
2020/0035101 A1   1/2020 Brooks et al.
2020/0116505 A1\* 4/2020 Lei ....................... H04W 4/021

FOREIGN PATENT DOCUMENTS

| JP | 2010-277532 A | 12/2010 |
| JP | 2015-060434 A | 3/2015 |
| KR | 2016066115 | 6/2016 |
| WO | WO-2018/232147 A1 | 12/2018 |

OTHER PUBLICATIONS

Siemens, "The office as an active contributor to business success," URL: https://new.siemens.com/bg/en/products/buildings/markets/smart-office.html, retrieved from internet Mar. 4, 2021, 12 pages.
Splan, "Visitor Management: Manage visitor registrations and check-ins in an efficient and secured manner." URL: https://www.splan.com/visitor-management-system.html, 12 pages.

\* cited by examiner

SMART BUILDING AUTOMATION SYSTEM WITH DIGITAL SIGNAGE

CROSS-REFERENCE TO RELATED APPLICATION

The present Application claims the benefit and priority to U.S. Provisional Patent Application No. 62/794,370, filed on Jan. 18, 2019, U.S. Provisional Patent Application No. 62/794,276, filed on Jan. 18, 2019, U.S. Provisional Patent Application No. 62/794,533, filed on Jan. 18, 2019, U.S. Provisional Patent Application No. 62/794,535, filed on Jan. 18, 2019, U.S. Provisional Patent Application No. 62/794,389, filed on Jan. 18, 2019, U.S. Provisional Patent Application No. 62/794,393, filed on Jan. 18, 2019, U.S. Provisional Patent Application No. 62/794,415, filed on Jan. 18, 2019, U.S. Provisional Patent Application No. 62/794,032, filed on Jan. 18, 2019, U.S. Provisional Patent Application No. 62/794,357, filed on Jan. 18, 2019, U.S. Provisional Patent Application No. 62/794,348, filed on Jan. 18, 2019, 62/794,407, filed on Jan. 18, 2019, U.S. Provisional Patent Application No. 62/794,502, filed on Jan. 18, 2019, U.S. Provisional Patent Application No. 62/794,489, filed on Jan. 18, 2019 the entire disclosures of each of which are incorporated by reference herein.

BACKGROUND

The present disclosure relates generally to a building management system and more particularly to building information management of a building management system that collects, manages, and protects data for interconnected devices and other entities. The present disclosure relates specifically to a building system configured to manage and display information associated with a building.

A building management system (BMS) is, in general, a system of devices configured to control, monitor, and manage equipment in and/or around a building or building area. A BMS can include, for example, an HVAC system, a security system, a lighting system, a fire alerting system, and any other system that is capable of managing building functions or devices, or any combination thereof. Various information from such system of devices may be relevant to occupants of the building. It may therefore be desirable to provide the information to the building's occupants.

SUMMARY

One implementation of the present disclosure is a one or more non-transitory computer-readable storage mediums having instructions stored thereon that, when executed by one or more processors, cause the one or more processors to receive, from a sensor, identifying information associated with an individual, query a database to retrieve context information corresponding to the individual, the database comprising a number of entities corresponding to two or more of spaces, equipment, people, or events and a number of relationships between the entities, the context information determined based on the entities and relationships of the database, determine a purpose of the individual based on the context information, dynamically generate a user interface element for a display based on the purpose of the individual, and control the display to display the user interface element.

In some embodiments, the context information includes a schedule having events associated with the individual, wherein the purpose of the individual is a next event on the schedule of the individual, and wherein the one or more processors generate the user interface element based on a location of the display and a location of the next event on the schedule of events. In some embodiments, the context information includes historical information describing patterns of activity associated with the individual, and wherein the one or more processors generate the user interface element based on the patterns of activity associated with the individual. In some embodiments, the context information includes an organizational role associated with the individual, and wherein the one or more processors generate the user interface element based on the organizational role associated with the individual. In some embodiments, the context information includes a visitor indicator indicating that the individual is a visitor to a building of the one or more buildings, and wherein the one or more processors generate the user interface element based on the visitor indicator, and wherein the user interface element includes a greeting for the individual. In some embodiments, the context information includes a parking space associated with the individual, and wherein the user interface element includes directions to the parking space. In some embodiments, the identifying information is at least one of biometric data, card data, or alphanumeric data. In some embodiments, the biometric data includes facial recognition data or voice recognition data, and wherein the alphanumeric data includes badge scan data. In some embodiments, the context information includes transportation information, and wherein the user interface element includes at least one of a public transportation schedule or directions to a transportation pickup location. In some embodiments, the context information includes privacy settings, and wherein the one or more processors generate the user interface element based on the privacy settings.

Another implementation of the present disclosure is a method for controlling digital signage, the method including receiving, from a sensor, identifying information associated with an individual, querying a database to retrieve context information corresponding to the individual, the database comprising a number of entities corresponding to two or more of spaces, equipment, people, or events and a number of relationships between the entities, the context information determined based on the entities and relationships of the database, determining a purpose of the individual based on the context information, dynamically generating a user interface element for a display based on the purpose of the individual, and controlling the display to display the user interface element.

In some embodiments, the context information includes a schedule having events associated with the individual, wherein the purpose of the individual is a next event on the schedule of the individual, and wherein the user interface element is generated based on a location of the display and a location of the next event on the schedule of events. In some embodiments, the context information includes historical information describing patterns of activity associated with the individual, and where the user interface element is generated based on the patterns of activity associated with the individual. In some embodiments, the context information includes an organizational role associated with the individual, and wherein the user interface element is generated based on the organizational role associated with the individual. In some embodiments, the context information includes a visitor indicator indicating that the individual is a visitor to a building associated with the digital signage, wherein the user interface element is generated based on the visitor indicator, and wherein the user interface element includes a greeting for the individual. In some embodiments, the context information includes a parking space associated with the individual, and wherein the user interface element includes directions to the parking space. In some embodiments, the identifying information is at least one of biometric data, card data, or alphanumeric data. In some embodiments, the biometric data includes facial recognition data or voice recognition data, and wherein the alphanumeric data includes badge scan data. In some embodiments, the context information includes transportation information, and wherein the user interface element includes at least one of a public transportation schedule or directions to a transportation pickup location.

Another implementation of the present disclosure is a digital signage system for one or more buildings, the digital signage system including one or more processing circuits and one or more computer readable storage media, the one or more computer readable storage media having instructions stored thereon that, when executed by the one or more processing circuits, cause the one or more processing circuits to receive, from a sensor, identifying information associated with an individual, query a database to retrieve context information corresponding to the individual, the database comprising a number of entities corresponding to two or more of spaces, equipment, people, or events and a number of relationships between the entities, the context information determined based on the entities and relationships of the database, determine a purpose of the individual based on the context information, dynamically generate a user interface element for a display based on the purpose of the individual, and control the display to display the user interface element.

BRIEF DESCRIPTION OF THE DRAWINGS

The above and other aspects and features of the present disclosure will become more apparent to those skilled in the art from the following detailed description of the example embodiments with reference to the accompanying drawings.

DETAILED DESCRIPTION

Referring generally to the FIGURES, described herein are systems and methods for managing content delivered to a smart display in a building. A building system may include a building and/or a building management system. The building may include digital signage positioned in a viewable position to one or more individuals in/around the building. The building may include one or more sensors configured to generate data for identifying the one or more individuals in/around the building. In various embodiments, the building management system is communicably coupled to the digital signage. In some embodiments, the building management system is configured to identify, based on the data from the one or more sensors, a person viewing the digital signage. The building management system may further be configured to retrieve information corresponding to the identified person, generate a user interface element for the digital signage based on the identified person, wherein the user interface element includes the information corresponding to the identified person, and control the digital signage to display the user interface element.

Generally speaking, the systems and methods described herein provide for intelligent delivery of content based on an identity of viewers of a digital signage positioned in a building. The embodiments described herein may alleviate burdens of receptionists or other building staff by proactively identifying viewers of the digital signage and providing information corresponding to the identified viewers on the digital signage. The embodiments described herein may provide for a more inviting building by welcoming visitors with personalized information. Further, the embodiments described herein may increase efficiency by directing viewers to their intended destination in a more rapid manner. For instance, where a viewer has a meeting at a conference room within the building, rather than having to look up the meeting location on the viewer's client device, the meeting location may be provided to the viewer on the digital signage. Various other benefits are described hereinafter with reference to the FIGURES described below. The embodiments described herein may increase building occupant safety by providing personalized emergency instructions to occupants during an emergency.

Figure 1A:
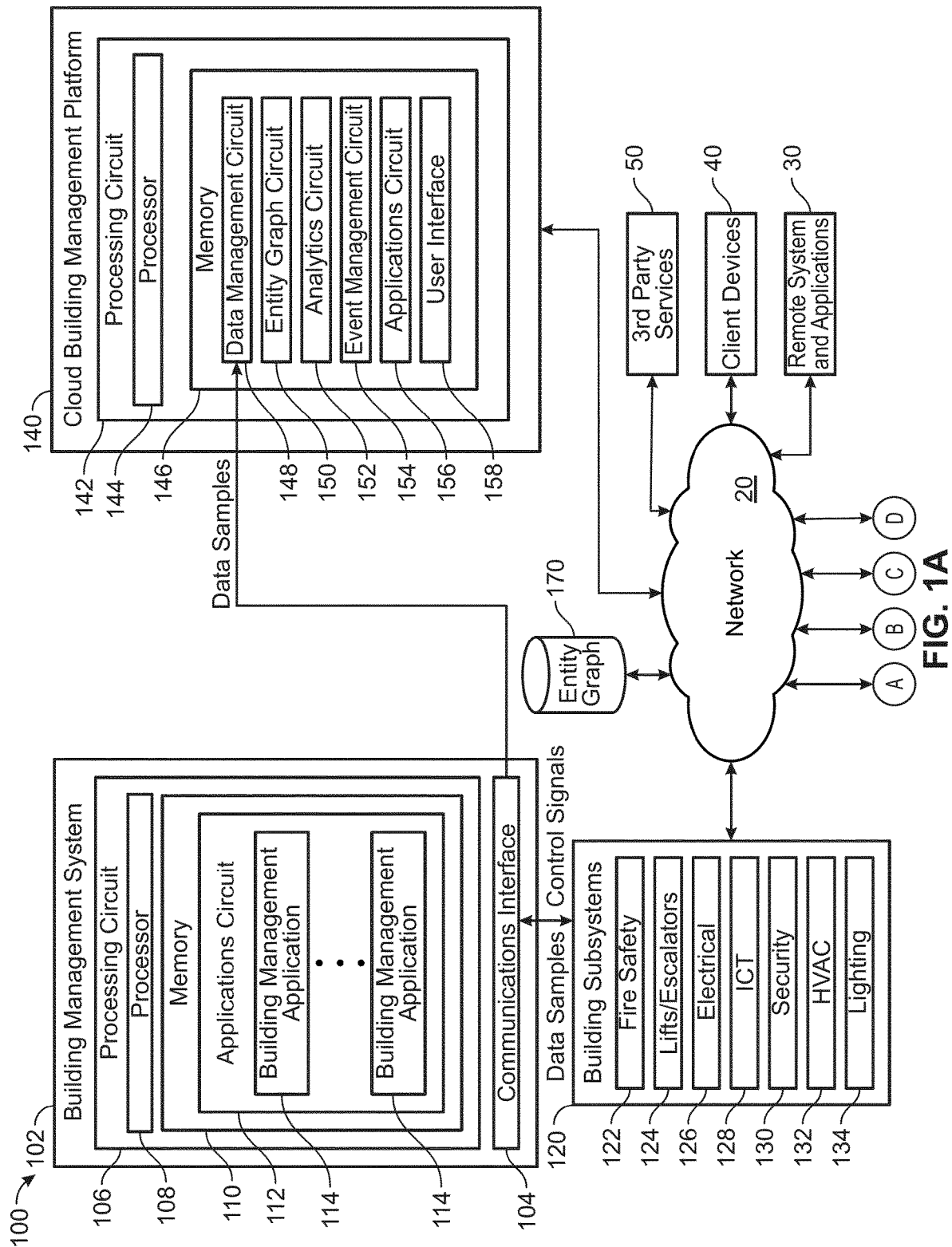
FIG. 1A is a block diagram of a smart building environment, according to an exemplary embodiment.
Figure 1B:
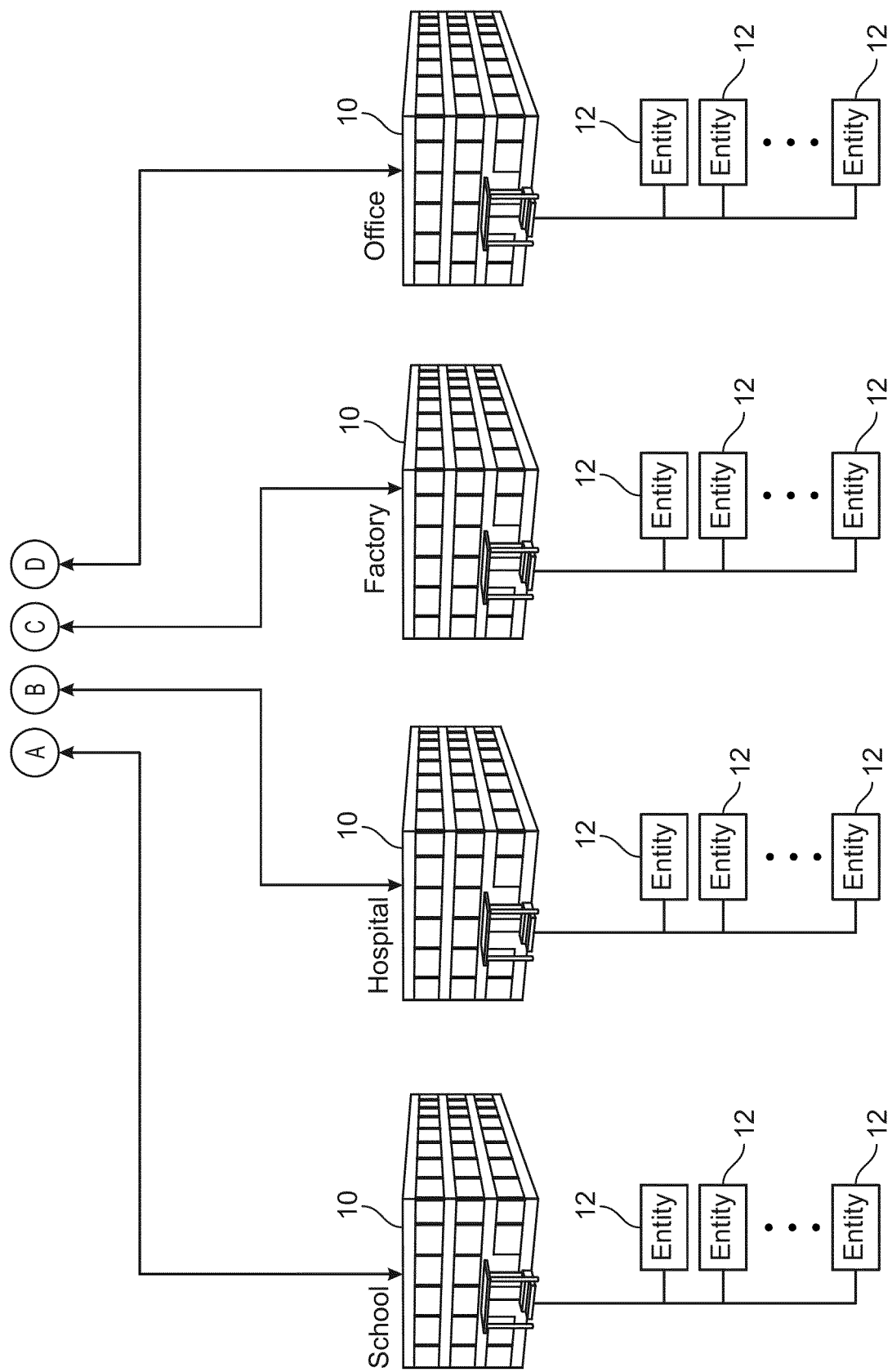
FIG. 1B is another block diagram of the smart building environment of FIG. 1A, according to an exemplary embodiment.

Hereinafter, example embodiments will be described in more detail with reference to the accompanying drawings. Referring now to FIGS. 1A-1B, a block diagram of a smart building environment 100 is shown, according to an exemplary embodiment. Smart building environment 100 is shown to include cloud building management platform 140. Cloud building management platform 140 may be configured to collect information from a variety of different data sources. Cloud management platform 140 may create digital representations, referred to as "digital twins," of physical spaces, equipment, people, and/or events based on the collected information. In various embodiments, the digital representations are stored in an entity graph. In brief overview, an entity graph is a data structure representing entities (e.g., spaces, equipment, people, events, etc.) and relationships between the entities. In various embodiments, the entity graph data structure facilitates advanced artificial intelligence and machine learning associated with the entities. In various embodiments, entities within the entity graph data structure include or are associated with "agents," or software entities configured to take actions with respect to the digital twins/real world entities with which they are associated. In some implementations, the agents may be configured to implement artificial intelligence/machine learning methodologies. The agents may be configured to facilitate communication and collection of information between the variety of different data sources. Each of the data sources may be implemented as, include, or otherwise use respective agents for facilitating communication amongst or between the data sources and cloud building management platform 140. The agents of cloud building management platform 140 and data sources may be configured to communicate using defined channels across which the agents may exchange information, messages, data, etc. amongst each other. In some examples, channels may be defined for particular spaces, subspaces, control loops, groups of equipment, people, buildings or groups of buildings, etc. In some implementations, agents may communicate by publishing messages to particular channels and subscribing to messages on particular channels and/or published by particular other agents/types of agents. In various embodiments, the data sources include buildings. For example, cloud building management platform 140 may interact with a number of buildings, each of which may include an agent (or a group of agents corresponding to various building subsystems within the respective building), to receive information. Hence, cloud building management platform 140 and the data sources may together form a network of agents to facilitate artificially intelligent exchange and communication of information across various channels. In some embodiments, one or more device(s), component(s), space(s) (and sets of devices, components, spaces) within cloud building management platform 140 may include a respective agent dedicated to perform various tasks associated therewith. The agents may therefore be dedicated for performing separate functions or tasks.

In various embodiments, cloud building management platform 140 collects data from buildings 10. For example, cloud building management platform 140 may collect data from buildings 10 such as a school, a hospital, a factory, an office building, and/or the like. It should be understood that the present disclosure is not limited to the number or types of buildings 10 shown in FIG. 1B. As new devices/components/spaces/buildings/events/control loops are added or otherwise incorporated into smart building environment 100, new digital representations (and associated agents, etc.) may be dynamically generated and incorporated into the entity graph data structure. Various examples of agents and corresponding networking may be found in U.S. patent application Ser. No. 15/934,593, filed Mar. 23, 2018, and titled "Building Management System with Dynamic Channel Communication", P.C.T. Application No. PCT/US2018/037,589, filed Jun. 14, 2018, and titled "Building Management System with Artificial Intelligence for Unified Agent Based Control of Building Subsystems," and U.S. patent application Ser. No. 16/036,685, filed Jul. 16, 2018, and titled "Systems and Methods for Agent Based Building Simulation for Optimal Control", the contents of each of which are incorporated herein by reference.

Buildings 10 may include entities 12. Entities 12 may include spaces, equipment, people, and/or events. In some embodiments, entities 12 include spaces such as floors, rooms, zones, campuses, buildings, and the like. In some embodiments, entities 12 include people such as employees, visitors, pedestrians, staff, and the like. In some embodiments, entities 12 include equipment such as inventory, assets, furniture, vehicles, building components, devices, and the like. For example, entities 12 may include devices such as internet of things (IoT) devices. IoT devices may include any of a variety of physical devices, sensors, actuators, electronics, vehicles, home appliances, and/or other items capable of communicating data over an electronic network (e.g., smart lights, smart appliances, smart home hub devices, etc.). In some embodiments, entities 12 include events such as meetings, fault indications, alarms, and the like. In various embodiments, cloud building management platform 140 receives information associated with buildings 10 and/or entities 12 and generates entity graph 170 based on the received information. Entity graph 170 may include digital twins that are digital representations of real world spaces, equipment, people, events, and/or the like. Entity graph 170 is described in greater detail below with reference to FIG. 3A-3B.

Smart building environment 100 may include building management system (BMS) 102. In various embodiments, BMS 102 communicates with cloud building management platform 140 to facilitate management and control of buildings 10 and/or the various operations described herein. BMS 102 may be configured to control, monitor, and/or manage equipment in or around a building or building area (e.g., such as buildings 10, etc.). For example, BMS 102 may include a HVAC system, a security system, a lighting system, a fire alerting system, and any other system that is capable of managing building functions or devices, or any combination thereof. Further, each of the systems may include sensors and other devices (e.g., IoT devices) for the proper operation, maintenance, monitoring, and the like of the respective systems. In some embodiments, each of buildings 10 is associated with a BMS 102. Additionally or alternatively, a single BMS 102 may manage multiple buildings 10. For example, a first BMS 102 may manage a first building 10, a second BMS 102 may manage a second building 10, and a third BMS 102 may manage the first and second buildings 10 (e.g., via the first and second BMS 102, in a master-slave configuration, etc.), as well as a third building 10. In various embodiments, BMS 102 communicates with building subsystems 120.

Building subsystems 120 may include fire safety subsystem 122, lift/escalators subsystem 124, building electrical subsystem 126, information communication technology (ICT) subsystem 128, security subsystem 130, HVAC subsystem 132, and/or lighting subsystem 134. In various embodiments, building subsystems 120 include fewer, additional, or alternative subsystems. For example, building subsystems 120 may additionally or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building 10. In some embodiment each of buildings 10 includes building subsystems 120. Additionally or alternatively, multiple buildings 10 may share at least some of building subsystems 120.

Each of building subsystems 120 may include any number of devices (e.g., IoT devices), sensors, controllers, and connections to facilitate functions and control activities. For example, HVAC subsystem 132 may include a chiller, a boiler, any number of air handling units, economizers, field controllers, supervisory controllers, actuators, temperature sensors, and other devices for controlling the temperature, humidity, airflow, or other variable conditions within buildings 10. Lighting subsystem 134 may include any number of light fixtures, ballasts, lighting sensors, dimmers, or other devices configured to controllably adjust the amount of light provided to a building space. Security subsystem 130 may include occupancy sensors, video surveillance cameras, digital video recorders, video processing servers, intrusion detection devices, access control devices and servers, or other security-related devices.

Cloud building management platform 140 and/or BMS 102 may interact with a variety of external systems. For example, cloud building management platform 140 may interact with remote systems and applications 30, client devices 40, and/or third party services 50. In various embodiments, systems and/or components of smart building environment 100 are configured to communicate using network 20. Network 20 may include hardware, software, or any combination thereof.

BMS 102 is shown to include communications interface 104 and processing circuit 106. Communications interface 104 may facilitate communications between BMS 102 and external systems/applications (e.g., cloud building management platform 140, remote systems and applications 30, client devices 40, third party services 50, building subsystems 120, etc.). Communications interface 104 may be or include wired or wireless communications interfaces (e.g., jacks, antennas, transmitters, receivers, transceivers, wire terminals, etc.) for conducting data communications within smart building environment 100 and/or with other external systems or devices. In various embodiments, communications via communications interface 104 is direct (e.g., local wired or wireless communications). Additionally or alternatively, communications via communications interface 104 may be via network 20 (e.g., a WAN, the Internet, a cellular network, etc.). For example, cloud building management platform 140 may communicate with BMS 102 using a wired connection and may communicate with client devices 40 (e.g., via BMS 102, etc.) using a cellular connection (e.g., a 4G or 5G access point/small cell base station, etc.). As a further example, communications interface 104 may include an Ethernet card and port for sending and receiving data via an Ethernet-based communications link or network. As a further example, communications interface 104 may include a Wi-Fi transceiver for communicating via a wireless communications network. As yet a further example, communications interface 104 may include cellular or mobile phone communications transceivers.

Processing circuit 106 may include processor 108 and memory 110. Processing circuit 106 may be communicably connected to communications interface 104 such that processing circuit 106 and the various components thereof can send and receive data via communications interface 104. Processor 108 may be implemented as a general purpose processor, an application specific integrated circuit (ASIC), one or more field programmable gate arrays (FPGAs), a group of processing components, or other suitable electronic processing components.

Memory 110 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. Memory 110 may be or include volatile memory or non-volatile memory. Memory 110 may include database components, object code components, script components, or any other type of information structure for supporting the various activities and information structures described in the present application. According to some embodiments, memory 110 is communicably connected to processor 108 via processing circuit 106 and includes computer code for executing (e.g., by processing circuit 106 and/or processor 108) one or more of the operations described herein.

In some embodiments, BMS 102 and/or cloud building management platform 140 are implemented within a single computer (e.g., one server, one housing, etc.). In various other embodiments BMS 102 and/or cloud building management platform 140 are distributed across multiple servers or computers (e.g., that can exist in distributed locations). In some embodiments, functions of BMS 102 and/or cloud building management platform 140 are implemented as agents. For example, BMS 102 may include a fault detection agent configured to analyze building data and detect faults associated with building components.

Memory 110 may include applications circuit 112 that may include building management application(s) 114. Building management application(s) 114 may include various systems to monitor and/or control specific processes/events within buildings 10. For example, building management application(s) 114 may include automated measurement and validation (AM&V), demand response (DR), fault detection and diagnostics (FDD), integrated control systems, and/or a building subsystem integration system. Building management application(s) 114 may be configured to receive inputs from building subsystems 120 and/or other data sources, determine improved and/or optimal control actions for building subsystems 120 based on the inputs, generate control signals based on the improved and/or optimal control actions, and provide the generated control signals to building subsystems 120.

Cloud building management platform 140 is shown to include processing circuit 142 having processor 144 and memory 146. In some embodiments, cloud building management platform 140 includes multiple processing circuits 142 each having one or more processors 144 and/or memories 146. Processor 144 may be a general purpose or specific purpose processor, an application specific integrated circuit (ASIC), one or more field programmable gate arrays (FPGAs), a group of processing components, or other suitable processing components. Processor 144 may be configured to execute computer code or instructions stored in memory 146 or received from other computer readable media (e.g., CDROM, network storage, a remote server, etc.).

Memory 146 may include one or more devices (e.g., memory units, memory devices, storage devices, etc.) for storing data and/or computer code for completing and/or facilitating the various processes described in the present disclosure. Memory 146 may include random access memory (RAM), read-only memory (ROM), hard drive storage, temporary storage, non-volatile memory, flash memory, optical memory, or any other suitable memory for storing software objects and/or computer instructions. Memory 146 may include database components, object code components, script components, or any other type of information structure for supporting the various activities and information structures described in the present disclosure. According to some embodiments, memory 146 is communicably connected to processor 144 via processing circuit 142 and includes computer code for executing (e.g., by processing circuit 142 and/or processor 144) one or more of the operations described herein.

Memory 146 may include data management circuit 148, entity graph circuit 150, analytics circuit 152, event management circuit 154, applications circuit 156, and/or user interface circuit 158. Data management circuit 148 may be configured to collect, manage, and/or retrieve data. In various embodiments, data management circuit 148 receives data samples from buildings 10 (e.g., via BMS 102, directly, etc.) and stores the data samples in structured storage. For example, the data samples may include data values for various data points. The data values may be measured and/or calculated values, depending on the type of data point. For example, a data point received from a temperature sensor may include a measured data value indicating a temperature measured by the temperature sensor. Data management circuit 148 may receive data samples from systems, components, and/or devices (e.g., IoT devices, sensors, etc.) within smart building environment 100 (e.g., remote systems and applications 30, client devices 40, third party services 50, BMS 102, building subsystems 120, etc.) and/or from external systems (e.g., the Internet, etc.). For example, data management circuit 148 may receive timeseries data from an occupancy sensor associated with one of buildings 10 and facilitate storage of the timeseries data in structured storage (e.g., in entity graph 170, etc.). As a further example, data management circuit 148 may receive an electronic calendar event (e.g., a meeting invitation, etc.) from one of client devices 40 and facilitate storage of the electronic calendar event in structure storage (e.g., in entity graph 170, etc.). In some embodiments, data management circuit 148 uses or retrieves an entity graph (e.g., via entity graph circuit 150, etc.) when organizing received data.

Entity graph circuit 150 may be configured to manage entity graph 170. In various embodiments, entity graph circuit 150 registers and manages various buildings (e.g., building 10, etc.), spaces, persons, subsystems (e.g., building subsystems 120, etc.), devices (e.g., IoT devices, etc.), events, and/or other entities in cloud building management platform 140. As described above, an entity may be any person, place, space, physical object, equipment, or the like. Further, an entity may be any event, data point, record structure, or the like. Entities and entity graph 170 are described in detail below with reference to FIGS. 3A-3B.

Analytics circuit 152 may be configured to analyze data to generate results. For example, analytics circuit 152 may analyze sensor data (e.g., weight measurements, image data, audio data, etc.) from a building lobby to identify a user. As a further example, analytics circuit 152 may apply fault detection rules to timeseries data from an HVAC system to detect a fault associated with the HVAC system. In various embodiments, analytics circuit 152 performs operations on information stored in entity graph 170. For example, analytics circuit 152 may traverse entity graph 170 to retrieve context information (e.g., energy usage, event activity, occupancy sensor data, HVAC control schedules, etc.) associated with one of buildings 10, and analyze the context information to determine a user schedule associated with the building (e.g., when the building is most heavily in use, etc.).

Event management circuit 154 may be configured to generate actions. For example, event management circuit 154 may receive event data from building subsystems 120 (e.g., a security alarm, etc.), and generate a response based on the event data (e.g., cause BMS 102 to sound an alarm, etc.). In various embodiments, event management circuit 154 generates actions dynamically. For example, event management circuit 154 may include artificially intelligent agents configured to generate actions in real-time based on received input. For example, event management circuit 154 may include an AI agent that dynamically generates a notification to an interested party in response to receiving an indication of an identified individual. As a further example, event management circuit 154 may receive a prediction from analytics circuit 152 that a building component is about to enter a fault state and may dynamically generate a work order ticket for the building component in response to the received prediction.

Applications circuit 156 may be configured to facilitate a variety of applications associated with cloud building management platform 140. For example, applications circuit 156 may facilitate a smart messaging system, a personal comfort system, a health and wellness system, a smart parking lot system, a smart signage system, a smart lobby system, a smart meeting room system, an employee productivity system, and/or the like. In various embodiments, applications circuit 156 facilitates operation of various systems that integrate with smart building environment 100. For example, applications circuit 156 may facilitate a FDD system that receives data from buildings 10 and generates fault indications associated with buildings 10.

User interface 158 may be configured to facilitate user interaction with cloud building management platform 140 and/or BMS 102. For example, a user may update personalized preferences associated with operation of cloud building management platform 140 via user interface 158. In some embodiments, user interface 158 facilitates dynamic feedback (e.g., a natural user interface, etc). For example, user interface 158 may facilitate chatbot interaction, voice commands, user authentication, biometric feedback, or the like.

Figure 2:
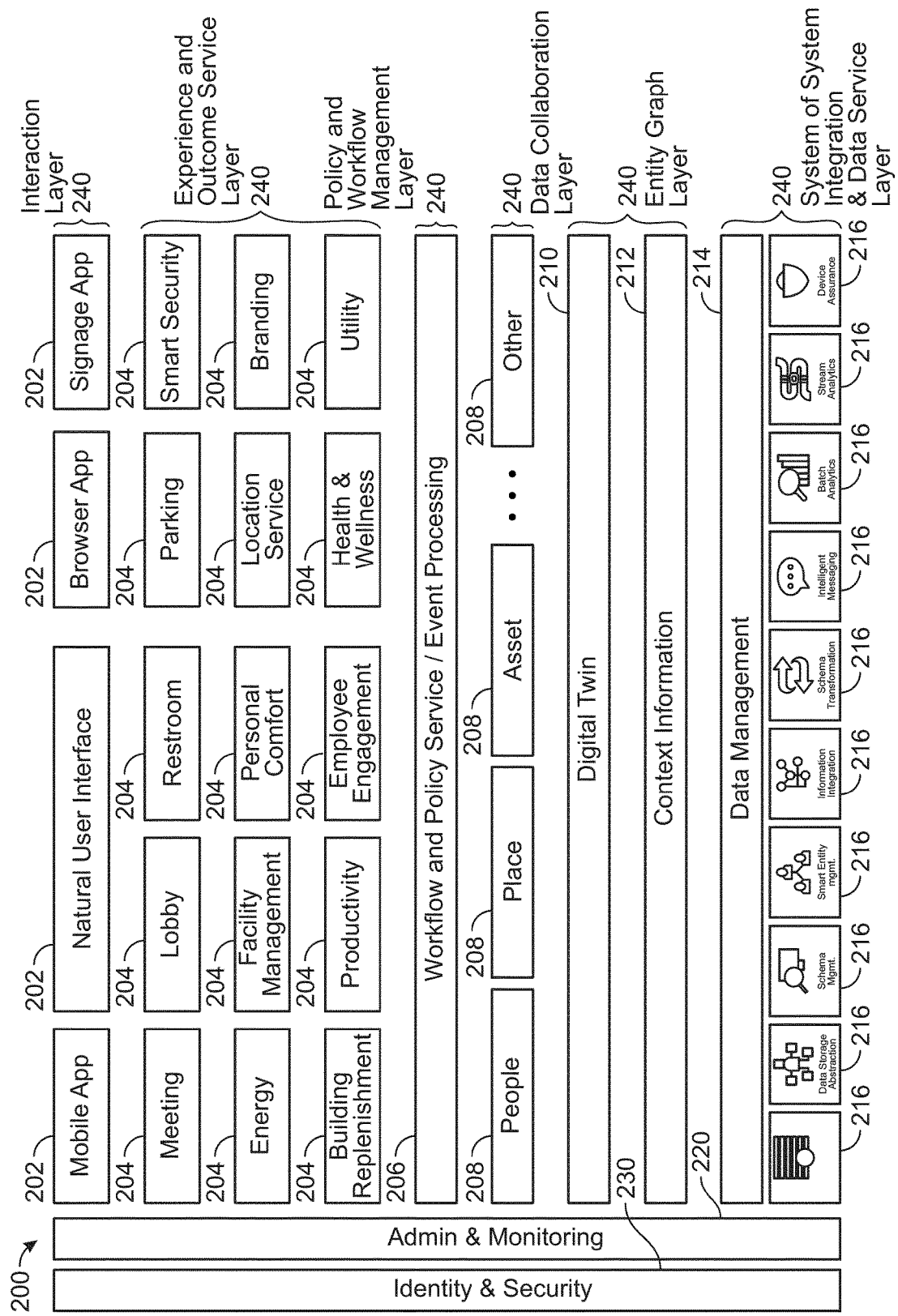
FIG. 2 is a block diagram of a building data platform associated with the smart building environment of FIGS. 1A-1B, according to an exemplary embodiment.

Referring now to FIG. 2, a building data platform 200 associated with the smart building environment 100 is shown, according to an exemplary embodiment. In various embodiments, cloud building management platform 140 implements the architecture of building data platform 200. Building data platform 200 is shown to include various layers 240. For example, layers 240 may include an interaction layer, an experience and outcome service layer, a policy and workflow management layer, data collaboration layer, entity graph layer, and/or a system of system integration and data service layer. In various embodiments, building data platform 200 includes interface(s) 202. For example, interface(s) 202 may include a mobile phone application, a natural user interface (e.g., voice recognition, chatbot services, text recognition, etc.), a browser application, a signage system, and/or the like. Interface(s) 202 may facilitate human-to-machine interaction, information visualization, and user experience functions.

In various embodiments, building data platform 200 includes service(s) 204. Service(s) 204 may include various user deliverables (e.g., outcomes, experiences, etc.) facilitated by building data platform 200. For example, service(s) 204 may include meeting scheduling, energy management, building supplies replenishment, lobby management (e.g., tracking a number of individuals in a building lobby and responding based on the number of individuals, etc.), facility management, productivity features (e.g., measuring and reporting on employee productivity, generating productivity suggestions, etc.), restroom management (e.g., monitoring a cleanliness of building restrooms, etc.), personal comfort management (e.g., adjusting building parameters based on occupant comfort preferences, etc.), employee engagement features (e.g., monitoring and reporting on employee engagement, generating engagement suggestions, etc.), parking management (e.g., dynamically assigning parking spaces, etc.), location services (e.g., generating actions based on users' locations, etc.), health and wellness features (e.g., monitoring and reporting on employee health and wellness, generating health and wellness suggestions, etc.), smart security (e.g., dynamically identifying individuals within a building, monitoring security parameters associated with a building, etc.), branding features (e.g., dynamic digital signage updating based on an identity of a viewer, etc.), and/or utility features (e.g., monitoring and reporting on building utility usage, generating suggestions to reduce utility consumption and/or cost, etc.). In various embodiments, service(s) 204 generate a virtual view of data from data collaboration, business workflows, and downstream sub-systems (e.g., sensors, actuators, etc.).

In various embodiments, building data platform 200 includes event processing 206. Event processing 206 may facilitate generating actions based on received data. For example, event processing 206 may receive an indication of an event within buildings 10, retrieve information associated with the event, and trigger a set of predefined workflows to perform management policies. In various embodiments, event processing 206 includes complex event processing and/or a business workflow processing engine (e.g., a rules engine, etc.) integrated with messaging and data models (e.g., event data models, etc.).

In various embodiments, building data platform 200 includes data source(s) 208. For example, data source(s) 208 may include data associated with people, places, assets, and/or the like. In various embodiments, building data platform 200 interacts with digital twins included in entity graph 170. For example, building data platform 200 may project a digital twin into a virtual data view to facilitate service(s) 204. Data source(s) 208 may manage a database view of digital representation of people, places and assets. In various embodiments, data source(s) 208 represent heterogenous source data schema as an open source common data model (e.g., a Brick Schema/extensions, etc.).

In various embodiments, entity graph layer 240 includes digital twin 210 and context information 212. Digital twin 210 is a digital representation of spaces, assets, people, events, and/or anything associated with a building or operation thereof. In various embodiments, digital twin 210 is modeled in entity graph 170. In various embodiments, digital twins 210 include an active compute process. For example, a digital twin 210 may communicate with other digital twins 210, and to sense, predict and acts. In various embodiments, digital twin 210 is generated dynamically. For example, a digital twin 210 corresponding to a conference room may update its status by looking at occupancy sensors or an electronic calendar (e.g., to turn its status "available" if there is no show, etc.). In various embodiments, digital twin 210 and/or entity graph 170 include context information 212. Context information 212 may include real-time data and a historical record of each system in the environment (e.g., campus, building, facility, space, etc.). Context information 212 may be stored in entity graph 170. In various embodiments, context information 212 facilitates flexible data modeling for advanced analytics and AI application in scenarios that model highly interconnected entities.

In various embodiments, building data platform 200 includes data management 214 and/or operation(s) 216. Data management 214 may manage, retrieve, and transmit data to various systems. For example, data management 214 may retrieve and transmit data integration protocols to OT sub-systems. Operation(s) 216 may include data storage attribution, schema management, smart entity management, information integration, schema transformation, intelligent messaging, batch analytics, stream analysis, and/or device assurance.

In various embodiments, building data platform 200 includes administration and monitoring 220 and/or identity and security 230. Administration and monitoring 220 may facilitate various administrative functions and/or operations. For example, an administrator may view memory allocation analytics associated with building data platform 200 (e.g., how much memory does entity graph 170 occupy, etc.). Identity and security 230 may facilitate various security features. For example, identity and security 230 may encrypt personally identifiable information (PII) included in digital twin 210.

Figure 3A:
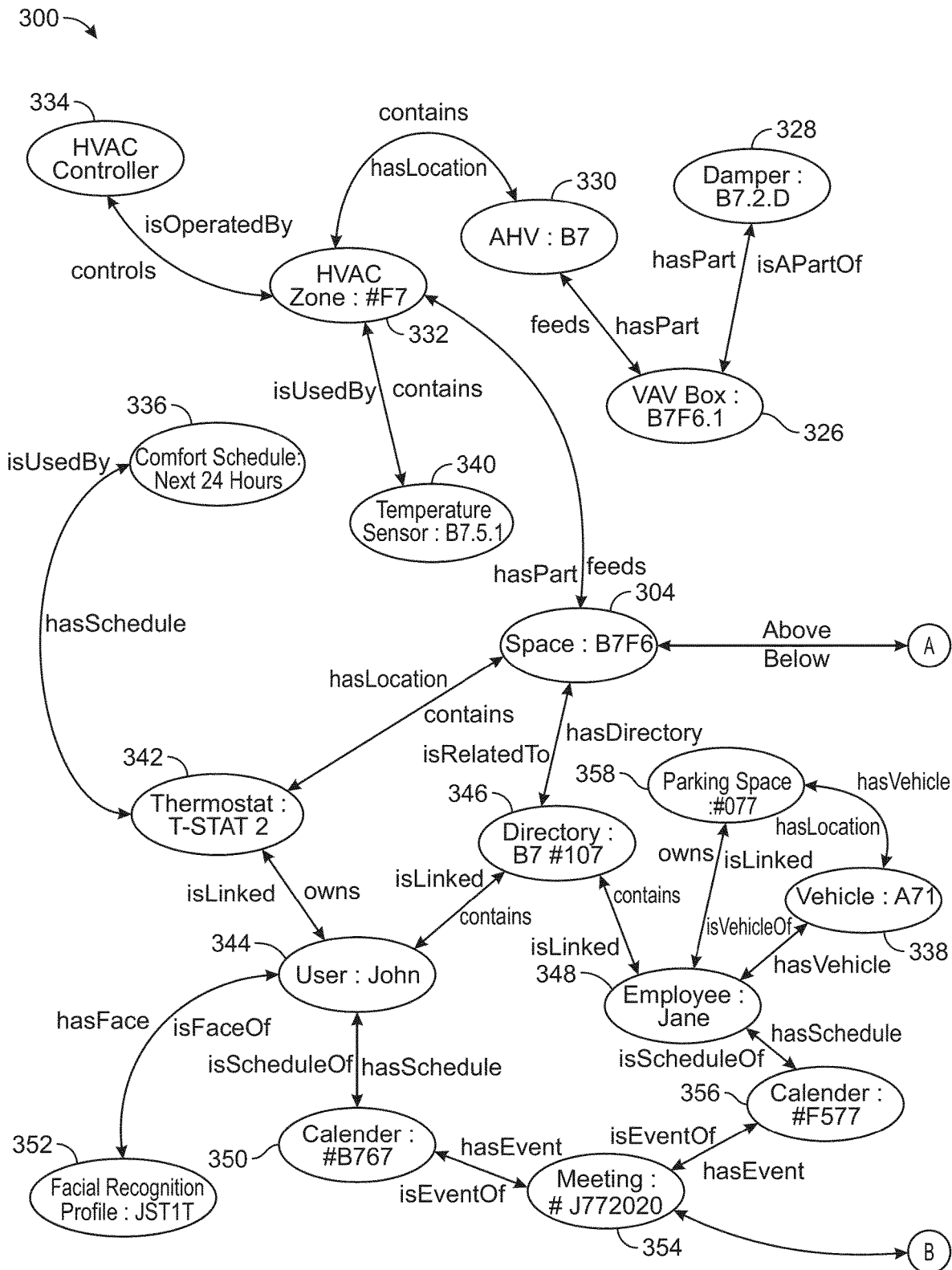
FIG. 3A is a block diagram of an entity graph, according to an exemplary embodiment.
Figure 3B:
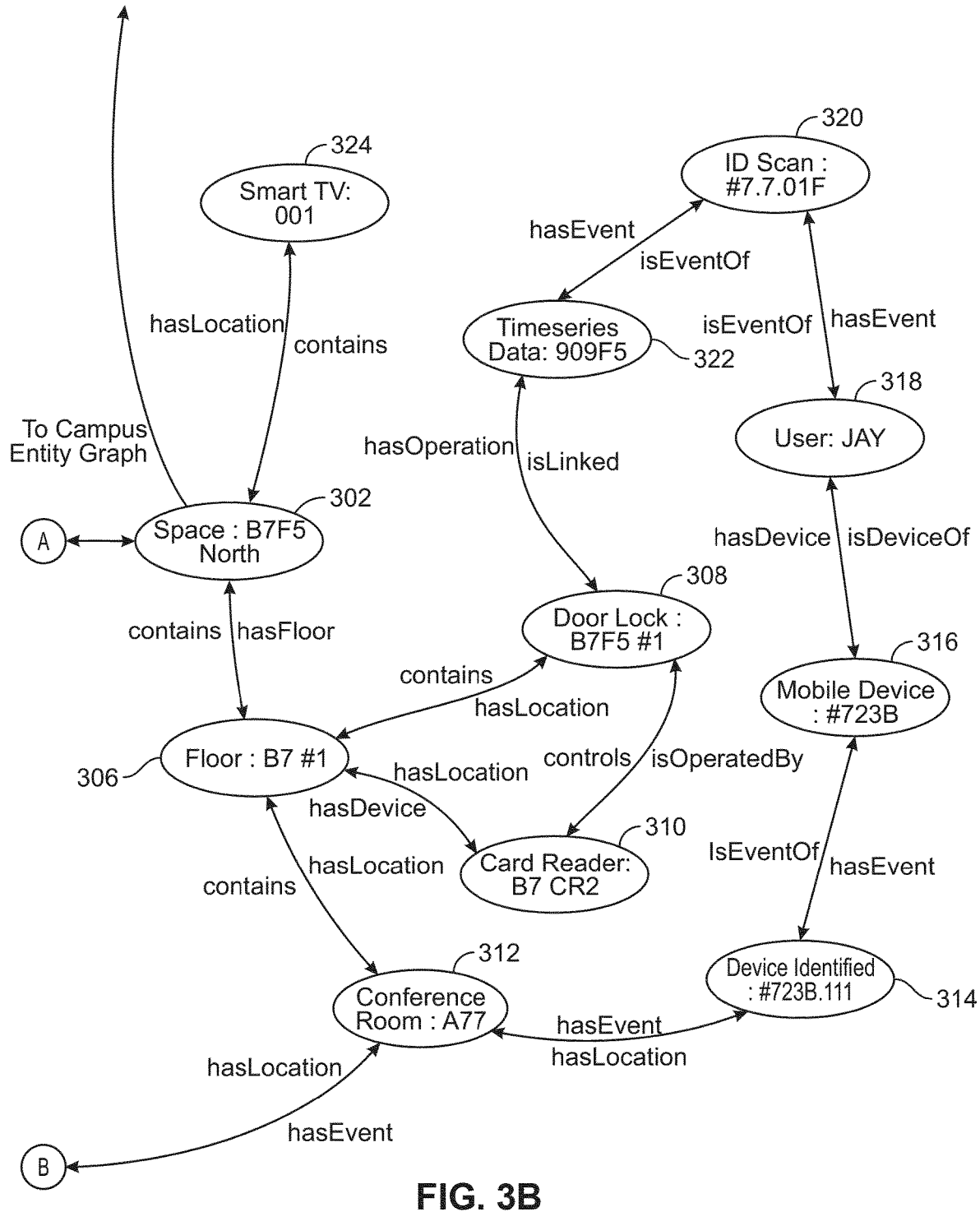
FIG. 3B is another block diagram of the entity graph of FIG. 3A, according to an exemplary embodiment.

Referring now to FIGS. 3A-3B, an entity graph 300 is shown in greater detail, according to an exemplary embodiment. In brief overview, entity graphs such as entity graph 170 and/or entity graph 300 are structured data stored in memory (e.g., a database, memory 146, etc.). Entity graphs such as entity graph 300 and/or entity graph 170 may include digital twins. Digital twins may be digital representations of real world spaces, equipment, people, and/or events. In various embodiments, digital twins represent buildings, building equipment, people associated with buildings, and/or events associated with buildings (e.g., buildings 10, etc.). An entity graph may include nodes and edges, where each node of the entity graph represents an entity and each edge is directed (e.g., from a first node to a second node) and represents a relationship between entities (e.g., indicates that the entity represented by the first node has a particular relationship with the entity represented by the second node). For example, an entity graph may be used to represent a digital twin of a person.

Entities can be things and/or concepts related to spaces, people, and/or asset. For example, the entities could be "B7F4 North", "Air Handling Unit," and/or "meeting room." The nodes can represent nouns while the edges can represent verbs. For example, the edges can be "isA," "hasPart," and/or "feeds." In various embodiments, the edges represent relationships. While the nodes represent the building and its components, the edges describe how the building operates. The nodes and edges together create a digital twin of a particular building. In some embodiments, the entities include properties or attributes describing the entities (e.g., a thermostat may have a particular model number attribute). The components of the entity graph form large networks that encode semantic information for a building.

The entity graph is configured to enable flexible data modeling for advanced analytics, control, and/or artificial intelligence applications, in some embodiments. These applications may require, or benefit from information modeling including interconnected entities. Other data modeling techniques based on a table, a hierarchy, a document, and/or a relational database may not be applicable. The entity graph can be a foundational knowledge management layer to support other higher level applications, which can be, complex root cause, impact analysis, building powerful recommendation engines, product taxonomy information services, etc. Such a multilayer system, a system of system topologies, can benefit from an underlying entity graph.

The entity graph can be a data contextualization layer for all traditional and/or artificial intelligence applications. The entity graph can be configured to capture evidence that can be used to attribute the strengths of entity relationships within the entity graph, providing the applications which utilize the entity graph with context of the systems they are operating. Without context (e.g., who the user is, what the user is looking for, what the target of a user request is, e.g., find a meeting room, increase a temperature in my office) these applications may never reach their full potential. Furthermore, the entity graph provides a native data structure for constructing question and answer type systems, e.g., a chatbot, that can leverage and understand intent.

The entity graph may not be a configuration database but may be a dynamic representation of a space, person, event, and the like. The entity graph can include operational data from entities which it represents, e.g., sensors, actuators, card access systems, occupancy of a particular space, thermodynamics of the space as a result of actuation, etc. The entity graph can be configured to continually, and/or periodically, ingest new data of the space and thus the entity graph can represent a near real-time status of cyber-physical entities and their inter-relationships. For this reason, artificial intelligence can be configured to introduce a virtual entity and new semantic relationships among entities, in some embodiments.

The entity graph is configured to facilitate adaptive controls, in some embodiments. The entity graph can be configured to adapt and learn over time. The entity graph can be configured to enable dynamic relationships between building information and other facility and enterprise systems to create new insights and drive new optimization capabilities for artificial intelligence systems. As relationships can be learned over time for the entity graph, the artificial intelligence systems and also learn overtime based on the entity graph. Entity graphs (e.g., space graphs, etc.) are described in greater detail with reference to U.S. patent application Ser. No. 16/260,078, filed on Jan. 28, 2019, the entire disclosure of which is incorporated by reference herein.

Entity graph 300 includes entities 302-358 (stored as nodes within entity graph 300) describing spaces, equipment, events, and people (e.g., business employees, etc.). In various embodiments, entities 302-358 are associated with or otherwise include agents (e.g., agents may be assigned to/associated with entities, etc.). Additionally or alternatively, agents may be represented as nodes in entity graph 300 (e.g., agent entities, etc.). Furthermore, relationships are shown between entities 302-358 directionally describing relationships between two of entities 302-358 (stored as edges within entity graph 300). In various embodiments, cloud building management platform 140 may traverse entity graph 300 to retrieve a description of what types of actions to take for a certain device, what the current status of a room is (e.g., occupied or unoccupied), etc.

As an example, entity graph 300 illustrates an office space called "B7F5 North" of a building. A smart TV referred to as "Smart TV 001" has a directional relationship to the space referred to as "B7F5 North." The relationship may be an edge "hasLocation" indicating that the device (e.g., the smart TV represented by entity 324) has a location (e.g., the space represented by entity 302). Furthermore, a second edge "contains" from entity 302 to entity 324 indicates that the location (e.g., the space represented by entity 302) includes the device (e.g., the smart TV represented by entity 324). In some embodiments, entity graph circuit 150 generates the nodes of entity graph 300 from various data sources including a building automation system, a security system, a fire alarm, human resources system, and/or building information model (BIM) files (e.g., through an entity name matching process, etc.). Furthermore, semantic relationships may be extracted from the building information by entity graph circuit 150. In some embodiments, only a single relationship exists between entities. In some embodiments, nodes and edges are determined dynamically as building data that is received and ingested into entity graph 300. For example, cloud building management platform 140 is configured to identify a door lock and card reader and generate a number of nodes and edges in entity graph 300 representing the card reader controller operation of the door lock.

Systems and Methods for Delivering Content

Figure 4A:
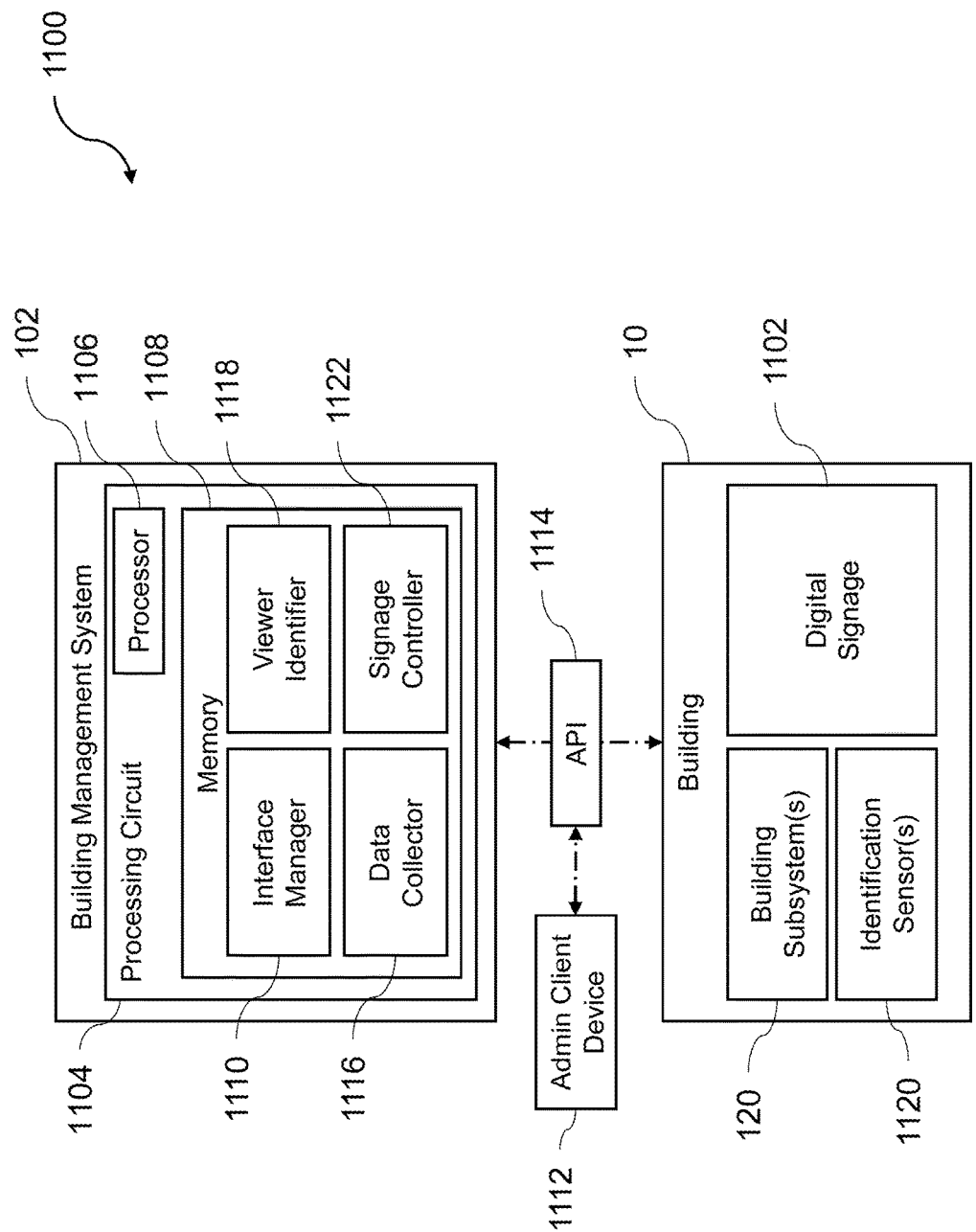
FIG. 4A is a block diagram of a system for managing content delivered to a smart display in a building, according to an exemplary embodiment.
Figure 4B:
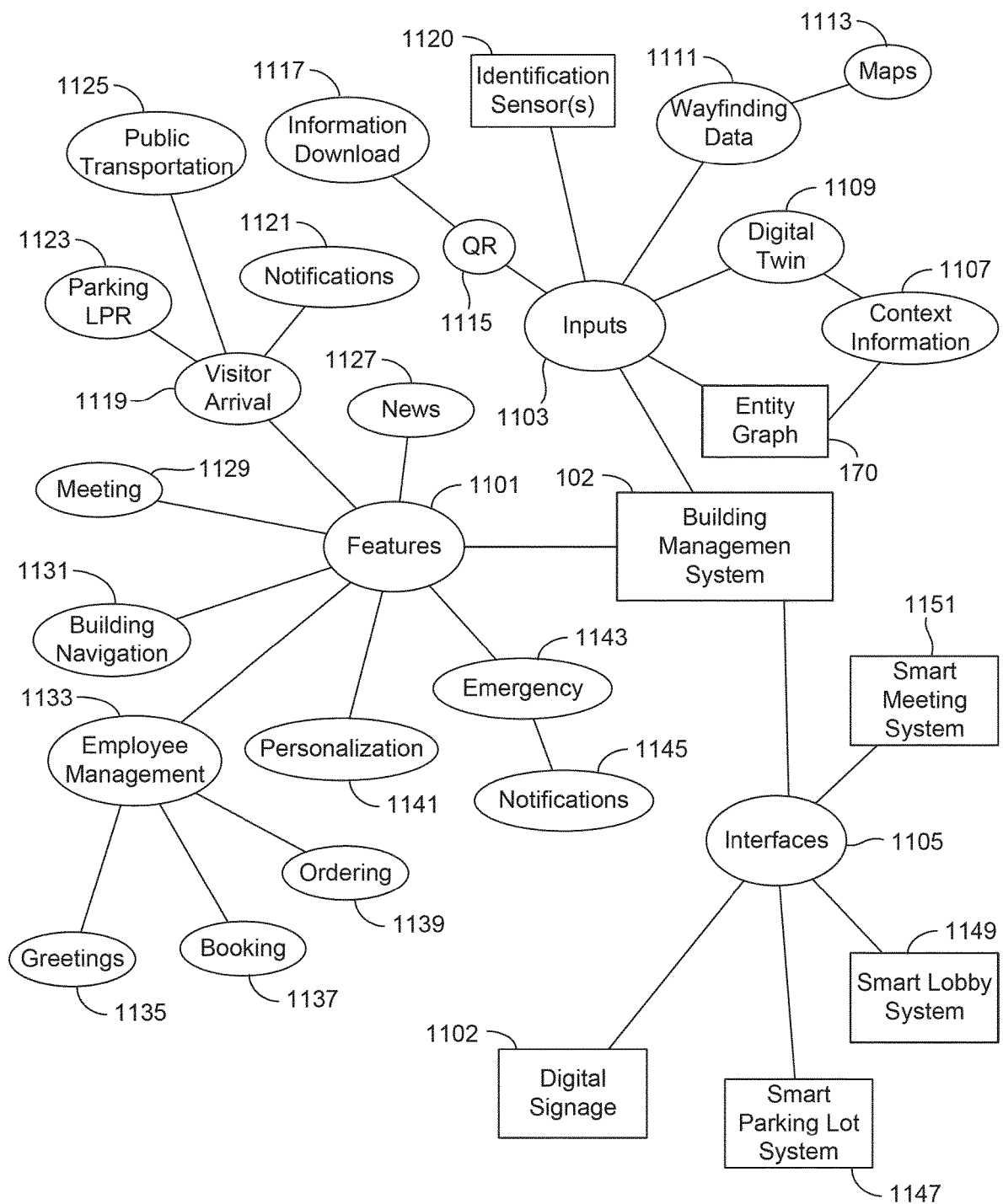
FIG. 4B is a node graph illustrating connections between features and components of the system of FIG. 4A, according to an exemplary embodiment.

Referring now to FIGS. 4A-4B, the building management platform is shown in greater detail. Specifically, FIG. 4A depicts a block diagram of a system 1100 for managing content delivered to a smart display in a building. The present application is related to U.S. Provisional Patent Application No. 62/794,370, titled "Smart Building Automation System With Digital Twin Configuration and Analytics," filed on Jan. 18, 2019, the entire disclosure of which is incorporated herein by reference. In some embodiments, one or more features of the present application may be implemented according to one or more features of the smart building automation system described therein. The system 1100 is shown to include the building management system 102 and a building 10. As described above, the building management system 102 may be configured to receive data from various building subsystems 120, entities 12 of buildings 10, among other data sources. The building management system 102 may be configured to process the data received from such data sources. As described in greater detail below, the building management system 102 may be configured to deliver content for displaying on a display, such as digital signage 1102, incorporated into or otherwise included in the building 10.

In various embodiments, the building management system 102 is configured to implement or otherwise facilitate various features 1101 (e.g., as shown in FIG. 4B, etc.). For example, building management system 102 may be configured to implement emergency notifications 1143, news updates 1127 (e.g., a news ticker, building events, organization events, meetings, etc.), visitor arrival features 1119 (e.g., displaying public transportation schedules, welcome messages, parking space assignments, etc.), meeting features 1129 (e.g., meeting directions, meeting reminders, meeting scheduling, etc.), personalized messages 1141, building navigation 1131 (e.g., displaying maps, displaying directions, etc.), and/or employee management features 1133 (e.g., food/beverage ordering, conference room booking, greeting employees, etc.). In some embodiments, building management system 102 may facilitate displaying public transportation information 1125 (e.g., a bus schedule, rideshare information, directions to designated pick-up locations, etc.) on digital signage located throughout a building 10. In some embodiments, building management system 102 may perform license plate recognition 1123 to identify visitors (e.g., identifying license plates of vehicles parked in a building parking lot, etc.). In some embodiments, building management system 102 facilitates visitor notifications 1121 (e.g., displaying welcome messages to visitors, displaying directions to visitors, etc.). In some embodiments, building management system 102 facilitates employee greetings 1135 (e.g., welcome messages, employee daily updates, etc.), conference room booking 1137 (e.g., scheduling conference rooms, etc.), and/or food/beverage ordering 1139. In some embodiments, building management system 102 facilitates emergency notifications 1145 (e.g., displaying personalized evacuation routes to users, displaying personalized instructions to users, etc.). In some embodiments, building management system 102 may facilitate identification of individuals entering building 10 and displaying personalized greetings to the individuals on digital signage located throughout building 10. In some embodiments, building management system 102 may facilitate receiving conference room reservations from employees via digital signage located throughout building 10.

In various embodiments, building management system 102 integrates with inputs 1103. For example, building management system 102 may receive/retrieve data from entity graph 170 (e.g., context information 1107, etc.), digital twin 1109, and/or identification sensor(s) 1120. Additionally or alternatively, building management system 102 may receive/retrieve data from external input devices, external data streams, or the like. In some embodiments, building management system 102 receives input from QR 1115 (e.g., badge scans, etc.). For example, building management system 102 may receive a QR code scan to initiate an information download 1117. In some embodiments, building management system 102 receives wayfinding data 1111. For example, building management system 102 may receive maps 1113 (e.g., directional data, digital maps, etc.). In various embodiments, building management system 102 interacts with various interfaces 1105. For example, building management system 102 may interact with smart meeting system 1151, smart lobby system 1149, smart parking lot system 1147, and/or digital signage 1102.

The building 10 is shown to include one or more building subsystems 120 including, but not limited to, fire safety subsystem 122, lifts/escalators subsystem 124, electrical subsystem 126, ICT subsystem 128, security subsystem 130, HVAC subsystem 132 and/or lighting subsystem 134.

The digital signage 1102 may be a display, such as a smart television or other smart display. For example, the digital signage 1102 may include a digital traffic sign, a lobby display, an elevator display, and/or any other digital display. In some embodiments, the digital signage 1102 may be a display configured to deliver, supply, display, or otherwise provide Closed Circuit Television (CCTV) content. In some embodiments, the digital signage 1102 includes a user device. For example, the digital signage 1102 may include a mobile device of a user. The digital signage 1102 may be configured to receive content from, at least, the building management system 102 for displaying, as described in greater detail below. In some embodiments, the digital signage 1102 is configured to receive user input from a user. For example, the digital signage 1102 may display an option to a user: "Would you like directions to the café or your meeting?" and receive a selection from the user.

The building management system 102 is shown to include a processing circuit 1104. The processing circuit 1104 may be similar in at least some aspects to processing circuit 106 described above with reference to FIG. 1A. In some implementations, the building management system 102 may be incorporated into or a component of cloud building management platform 140 described above with reference to FIG. 1A. The processing circuit 1104 includes a processor 1106 and memory 1108. The processor 1106 may be similar in at least some aspects to processor 108 of FIG. 1A. The memory 1108 may be similar in at least some aspects to memory 110 of FIG. 1A.

The building management system 102 may be communicably coupled to the building subsystems 120 and digital signage 1102. The building management system 102 may be communicably coupled to the building subsystems 120 and digital signage 1102 via a network (such as network 20). The network may be a Wide Area Network (WAN), a cellular network, or other network configured to facilitate exchange of information between two or more devices located remotely from one another.

The memory 1108 is shown to include various applications (e.g., machine instructions, etc.). The applications may be or include sets of instructions for performing various functions. The processor 1106 may be configured to use the instructions from the applications for performing the functions described herein. Each of the applications may be separate from one another. In some embodiments, some of the applications may be grouped together to form a single application. Hence, the present disclosure is not limited to the particular arrangements depicted in FIG. 4A. To the contrary, in some implementations, the applications may be stored remotely from the building management system 102. In such implementations, the building management system 102 may access the applications via, for instance, a network.

The memory 1108 may store an interface manager 1110. The interface manager 1110 may be an application designed or implemented for generating an interface or user interface elements which together form an interface for the digital signage 1102. The interface manager 1110 may be configured to receive various settings for generating the user interface, as described in greater detail below.

The building management system 102 may be communicably coupled to an administrator (or admin) client device 1112. The admin client device 1112 may correspond to an administrator or information technology (IT) department member within an enterprise corresponding to the building 10. In some embodiments, the admin client device 1112 may be located at the building 10. In such embodiments, the admin client device 1112 may be communicably coupled to the building management system 102 via the network described above (hence, the network which connects the building management system 102 to the building subsystems 120 and digital signage 1102 may connect the building management system 102 to the admin client device 1112). In embodiments where the admin client device 1112 is located separate from the building 10, the admin client device 1112 may be communicably coupled to the building management system 102 via a separate network than the network which connects the building management system 102 to the building subsystems 120 and digital signage 1102.

In some embodiments, the interface manager 1110 may be configured to receive commands corresponding to settings for generating the interface/user interface elements from the admin client device 1112. The admin client device 1112 may be configured to structure the commands in accordance with an Application Programming Interface (API) 1114. The API 1114 may be or include a set of definitions, protocols, or other tools which together define and/or facilitate communication or exchange of commands between two components. The API 1114 may define a structure of commands or packets exchanged between the admin client device 1112 and the building management system 102. Hence, the admin client device 1112 may generate or form command(s) in accordance with the API 1114, and communicate the command(s) to the building management system 102 via the network (and vice versa).

The admin client device 1112 may be configured to receive selection(s) for various settings from an administrator. The admin client device 1112 may be configured to display available settings which may be customized by the administrator. For instance, the available settings may be or include settings corresponding to pre-defined content (such as a source for the pre-defined content), a duration in which content is displayed (for instance, a number of minutes or seconds until the content is refreshed, a page is updated with new content, a first page with first content is flipped to a second page with second content, and so forth), a schedule for content (e.g., what time of day certain content is displayed on the interface), and/or a format of content (text or image size, colors, fonts, location of content, and so forth). Each of these settings may be selected, modified, configured, and/or otherwise customized by the administrator through providing the corresponding selection via the admin client device 1112. Hence, the In some embodiments, the admin client device 1112 is configured to receive the selections from the administrator. The admin client device 1112 may generate commands which are structured in accordance with the API 1114 based on the selections from the administrator. The admin client device 1114 then communicates the generated commands to the building management system 102 for implementation.

In some examples, the selection from the administrator may be an override selection. The override selection may be a selection to override regularly scheduled, automatically generated content or other content which is currently being displayed on the digital signage 1102 with manually generated content. The user may generate the content via the admin client device 1112 or otherwise provide the content to the digital signage 1102 (or to the building management system 102, which then provides the content to the digital signage 1102) via the network and API 1114. The digital signage 1102 may be configured to receive the content (e.g., either from the admin client device 1112 directly or indirectly via the building management system 102). The digital signage 1102 may be configured to interrupt, interfere, or otherwise override the content which is currently displayed on the digital signage 1102 with the manual content (e.g., from the admin client device 1112). The manual content may be pre-defined content, substitute content, or other content which may be universally applicable. As one non-limiting example, the pre-defined content may be a list of available services and facilities at the building 10, a location of various facilities, general information corresponding to the building 10 or enterprise which owns, occupies, or otherwise operates the building 10 (such as historical information, news, facts, etc.).

In some embodiments, the interface manager 1110 is configured to generate content for a user interface element for rendering on the digital signage 1102. The interface manager 1110 may be configured to generate the user interface element in accordance with the settings received from the admin client device 1112. The user interface element may be a widget, element, window, or some other aspect of a user interface displayed on the digital signage. In some embodiments, the user interface element may span the entirety of viewable area for the digital signage 1102. In other embodiments, the user interface element may be a portion of the viewable area for the digital signage.

The interface manager 1110 may be configured to generate the user interface element based on data received from one or more devices/components. The memory 1108 may include a data collector 1116. The data collector 1116 may be an application designed or implemented for data from the various building subsystems 120 and/or admin client device 1112. The data collector 1116 may be configured to receive data generated by such components (e.g., the various building subsystems 120 and/or admin client device 1112). The building subsystems 120 (e.g., components, such as sensors, devices, etc. within the building subsystems 120) may be configured to generate data for communication to the building management system 102. The building subsystems 120 may be configured to generate the data based on (e.g., in accordance with) the API 1114. For instance, a building subsystem 120 which generates sensor data may format the data in a packet based on the API 1114. The data collector 1116 may be configured to receive the data from the various building subsystems 120. In various embodiments, data collector 1116 may be configured to retrieve information from structured data. For example, data collector 1116 may traverse a digital twin to retrieve context information. Additionally or alternatively, data collector 1116 may query an entity graph (e.g., entity graph 170, etc.) to retrieve context information.

The interface manager 1110 may be configured to generate the user interface elements based on, at least, the data received or otherwise collected by the data collector 1116. Hence, the interface manager 1110 may generate the user interface elements based on real-time data (or near real-time data) from or corresponding to the building subsystems 120. The interface manager 1110 may generate the content for rendering on the digital signage 1102. The interface manager 1110 may generate content for user interface elements for viewing by person(s) located or otherwise positioned in a viewable region for the digital signage 1102. In some embodiments, the content may be or correspond to emergency situations (which may be universally applicable to all persons). In some embodiments, the content may be particular to a particular user or group of users (such as members of particular departments, groups, visitors, individual employees, individual visitors, and so forth). For example, the content may include personalized emergency instructions (e.g., evacuation routes, etc.). In various embodiments, the content is displayed on one or more digital signage 1102. For example, the content may include turn-by-turn directions and be displayed on a number of digital signage 1102 located at various hallway intersections within the building 10 (e.g., each successive digital signage 1102 displaying successive directions, etc.). Each of these embodiments are described in further detail below.

In some embodiments, the data may be or include data corresponding to an emergency. For instance, the data collector 1116 may be configured to receive data from the fire safety subsystem 122 and/or security subsystem 130 (e.g., devices or components within the fire safety subsystem 122 and/or security subsystem 130). The data may be indicative of an emergency. For instance, the data may be from a fire detection sensor within the fire safety subsystem 122. The fire detection sensor may be a smoke sensor, a temperature sensor, etc. The fire detection sensor may generate data corresponding to the presence or absence of smoke, an increase in temperature, etc. The fire detection sensor may provide the data to the data collector 1116. The data collector may receive the data from the fire safety subsystem 122. In such embodiments, the interface manager 1110 may be configured to generate an emergency warning user interface element. The emergency warning user interface element may be or include an indication that an emergency condition is present within the building. The emergency warning user interface element may be or include instructions for exiting the building 10 or directing person(s) to a safe area within the building 10. In some embodiments, the emergency warning user interface element may be personalized. For example, building management system 102 may transmit personalized evacuation directions to a mobile device associated with a user based on the location of the user.

In some embodiments, the data may be or include information corresponding to particular occupants of the building 10. For instance, the data may be or include information pertaining to particular individuals (such as specific visitors or employees), a particular group of individuals (such as a group of visitors, a team or group of employees, etc.). In such embodiments, the building management system 102 is configured to identify viewers of the digital signage 1102. In some embodiments, the building management system 102 is configured to modify presented information based on privacy settings. For example, a user may configure building management system 102 to not display personal information (e.g., a schedule of the individual, etc.) on digital signage 1102 located in public spaces. In some embodiments, building management system 102 is configured to display information across multiple digital signage 1102.

The memory 1108 may include a viewer identifier 1118. The viewer identifier 1118 may be an application designed or implemented to identify viewers of the digital signage 1102. The viewer identifier 1118 may be configured to receive identification data from, for instance, identification sensors 1120 arranged in the building 10 near (e.g., in proximity to) the digital signage 1102. The identification sensor(s) 1120 may include, for instance, biometric sensors (such as cameras, fingerprint scanners, facial recognition, etc.), card readers (RFID scanners, barcode or QR scanners, badge scanners, etc.), microphones (e.g., to facilitate voice recognition technology, etc.), and/or other types scanners or sensors configured to identify persons or individuals. In some embodiments, viewer identifier 1118 receives alphanumeric data from identification sensor(s) 1120. In some embodiments, the identification sensor(s) 1120 may be incorporated into or otherwise mounted on the digital signage 1102. Additionally or alternatively, the identification sensor(s) 1120 may be positioned remotely of the digital signage 1102. The identification sensor(s) 1120 may be configured to generate data corresponding to the identification of viewers (i.e., person(s) viewing) the digital signage 1102. For instance, as a person approaches the digital signage 1102, the cameras may be configured to capture an image of the person's face. As another example, when a person swipes an identification card at a card reader upon entering a room or space including the digital signage 1102. As a further example, cameras may identify a license plate number of a vehicle. In each example, the identification sensor(s) 1120 (e.g., the camera, card reader) generate data corresponding to the identity of the person viewing the digital signage 1102. The identification sensor(s) 1120 may be configured to provide the generated data to the building management system 102. The identification sensor(s) 1120 may structure the generated data according to the API 1114 and transmit the data to the building management system 102 via the network.

The viewer identifier 1118 may be configured to receive the data from the identification sensor(s) 1120. The viewer identifier 1118 may be configured to identify the viewer(s) of the digital signage 1102 based on the data received from the identification sensor(s) 1120. The interface manager 1110 may be configured to retrieve or otherwise access information/data which is relevant to the viewer(s) of the digital signage 1102, as described in greater detail below. In some embodiments, the viewer identifier 1118 is configure to use near-field-communication (NFC), Bluetooth, WiFi, and/or cellular connections (e.g., via a 4G or 5G access point/small cell base station, etc.) to identify the viewer(s) of the digital signage 1102 and/or a location of the viewer(s).

In some embodiments, the viewer identifier 1118 includes a facial recognition system. The facial recognition system may be configured to analyze faces contained in images captured via the identification sensor(s) 1120 (where the identification sensor(s) 1120 are camera(s)). The facial recognition system may be configured to identify, extract, locate, etc. features within the faces contained in the images. The facial recognition system may be configured to compare the features within the faces to a database including features of known or unknown individuals (e.g., employees, registered visitors, unregistered or general visitors, etc.). The database may be structured to include features and an identity corresponding to those features. The facial recognition system may be configured to cross-reference the database with the features identified in the image. Upon locating an entry in the database having features which match (e.g., within a certain threshold, exact, etc.) the features identified in the image, the facial recognition system may be configured to identify the identity of the individual corresponding to the entry in the database. Additionally or alternatively, the viewer identifier 1118 may include a license plate and/or vehicle recognition system. The license plate and/or vehicle recognition system may be configured to analyze vehicles contained in images captured via the identification sensor(s) 1120 (where the identification sensor(s) 1120 are camera(s)). The license plate and/or vehicle recognition system may be configured to identify, extract, locate, etc. features of the vehicles contained in the images. The license plate and/or vehicle recognition system may be configured to compare the features of the vehicles (e.g., a license plate number, a shape, a size, a headlight placement, a headlight shape, etc.) to a database including features of known or unknown vehicles. The license plate and/or vehicle recognition system may be configured to identify a make and/or model of a vehicle. In various embodiments, the license plate and/or vehicle recognition system may identify an individual associated with the vehicle. For example, the license plate and/or vehicle recognition system may cross-reference the database using an identified license plate number to identify an individual having an associated matching license plate number.

In some embodiments, the viewer identifier 1118 is configured to trigger additional actions based on identifying the viewer(s) of the digital signage 1102. For example, the viewer identifier 1118 may transmit a notification to the building management system 102 in response to identifying a visitor that has arrived at the building 10. As a non-limiting example, the building management system 102 may notify an employee associated with the visitor (e.g., a meeting host of a meeting on a schedule of the visitor, security personnel, etc.) that the visitor has arrived based on the notification from the viewer identifier 1118 identifying the visitor. To continue the example, the notified employee may respond to the notification (e.g., via a selection, via free-form text, etc.) and the building management system 102 may generate a user interface element for display on the digital signage 1102 based on the response of the notified employee.

In some embodiments, the viewer identifier 1118 includes an identification system including a database. The database may be structured to store entries including a unique identifier associated with known individuals (e.g., employees, registered visitors, etc.). The identification system may receive the data from the identification sensor(s) 1120 (e.g., a code or data corresponding to a key card, a barcode, QR code, etc.). The identification system may be configured to cross-reference the database with the data received from the identification sensor(s) 1120 to identify the individual which scanned, for instance, their badge or key card on the identification sensor(s) 1120.

While these two examples are provided, the present disclosure is not limited to these particular examples of identifying individuals who are viewing the digital signage 1102. To the contrary, the viewer identifier 1118 may identify individuals in any number of ways based on data from the identification sensor(s) 1120. Various combinations identification sensor(s) 1120 and data, along with recognition system(s), may be incorporated into the system 1100 for identifying individuals who are viewing the digital signage 1102.

In some embodiments, the interface manager 1110 may be configured to extract, access, or otherwise retrieve data based on the identity of the person(s) viewing the digital signage 1102. The interface manager 1110 may be configured to retrieve data which is relevant to the person(s) viewing the digital signage 1102. The interface manager 1110 may be configured to retrieve data from a database including information pertaining to the identified person(s). The database may include information corresponding to the identified person(s) schedules and meetings, building 10 access information, and so forth. The interface manager 1110 may be configured to cross-reference an identifier corresponding to the identified person(s) (based on data from the viewer identifier 1118) with the database. The interface manager 1110 may be configured to extract or otherwise retrieve the information from the database corresponding to the identified person(s). In various embodiments, the interface manager 1110 is configured to retrieve context information corresponding to the identified person(s). For example, the interface manager 1110 may retrieve a schedule (e.g., a calendar, an itinerary, etc.) associated with the identified person(s). The context information may include various information describing the identified person(s). As one non-limiting example, the context information may include user preferences of the person (e.g., what sort of food the person likes, personalization settings of the person, feedback from the person etc.), patterns associated with the person (e.g., common paths traveled by the person within the building, etc.), and historical information associated with the person (e.g., how many times the person has visited the building, physical characteristics of the person such as if the person is mobility restricted, etc.). In some embodiments, the context information is associated with a digital twin of the identified person(s). For example, the context information may be determined by traversing a database including digital twin entities of people, spaces, equipment, events, and the like. In various embodiments, the smart entity described herein includes context information. In various embodiments, the interface manager 1110 determines a purpose of the identified person based on the context information. For example, the interface manager 1110 may analyze the context information (e.g., a schedule of the identified person, etc.) to determine a next event associated with the identified person. In various embodiments, the purpose of the identified person includes attending the next event associated with the identified person. Additionally or alternatively, the purpose of the identified person may include additional elements. For example, the interface manager 1110 may determine, based on the historical actions of the identified person (e.g., as contained in the context information), that the identified person always drinks a coffee in the morning. Therefore, the interface manager 1110 may include an element associated with obtaining coffee to the purpose of the identified person. In various embodiments, the interface manager 1110 may generate the user interface element based on the determined purpose of the identified person. To continue the previous example, the interface manager 1110 may determine an individual has the purpose of "attend the next scheduled event" and "obtain coffee" and may therefore generate a user interface element for display on the digital signage 1102 directing the identified person on a route through a café of the building 10 and ending at a conference room associated with the next scheduled event.

The database may be integrated or incorporated into or otherwise a component of a smart entity structure or network. The database may be configured to store, revise, update, etc. data as an entry corresponding to known and identified person(s). Each entry may be associated with, correspond to, or otherwise reference other object entities which are associated therewith (for instance, different sources of data corresponding to known individuals). In some embodiments, the smart entity may include or incorporate a plurality of agents configured to perform dedicated tasks. For instance, the viewer identifier 1118 may be configured as an agent designed to perform dedicated tasks corresponding to identifying viewers of the digital signage 102, and the interface manager 1110 may be configured as an agent designed to perform dedicated tasks corresponding to managing the user-facing aspects of the digital signage 1102. The interface manager 1110 may be configured to query, request, or otherwise ping the database using, for instance, the data from the identification sensor(s) 1120, for determining whether an object entity in the database corresponds to the identified viewer. Where an entry from the database corresponding to the identified viewer is identified by the interface manager 1110, the interface manager 1110 may ping, query, or otherwise retrieve data and information about the identified viewer from other object entities/sources which are associated with the entry. Hence, the database may be structured of a network of entities which together are used for identifying individuals and representing relationships corresponding to data for the individual. Where no entries are present in the database, the viewer identifier 1118 and/or interface manager 1110 may be configured to automatically generate a new entry. As new information is identified for the individual (or person(s)), the interface manager 1110 may add or update new object entities to dynamically map information to the network which corresponds to the individual. In this regard, when the person visits the building 10 premises at a subsequent time, the new object entities may be used for generating the interface. The network may adaptively be updated to reflect the smart entity's "understanding" of the person as they are identified at various points in time (e.g., based on the person(s) reactions in different settings or conditions, interactions with the smart entity, etc.).

Various non-limiting examples of the types of information stored in the database and manner in which person(s) are identified are provided hereafter for reference. However, the present disclosure is not limited to these particular examples.

As one example, the identified person(s) may be a visitor for a meeting with an employee of the building 10. The visitor may be pre-registered with the building management system 102 (e.g., by filling out a form, by the employee which they are visiting, etc.). The visitor may provide a license plate number of a vehicle they are driving to the meeting and may be assigned a parking space at the building 10. When the visitor approaches the building 10 (e.g., on an access road, etc.), the identification sensor(s) 1120 may generate data corresponding to the visitor (e.g., capture an image including the license plate of the vehicle the visitor is driving). The viewer identifier 1118 may receive the image from the identification sensor(s) 1120. The viewer identifier 1118 may identify the visitor based on the image by cross-referencing the identified license plate number with data in the database (including the license plate number provided by the visitor). The interface manager 1110 may retrieve context information associated with the identified visitor (e.g., an assigned parking space of the visitor, a schedule of the visitor including the meeting time and location, etc.). For example, the interface manager 1110 may traverse a digital twin (e.g., as represented by entity graph 170 and/or a space graph, etc.) associated with the identified visitor to retrieve an assigned parking space of the visitor, a schedule of the visitor, and the like. The interface manager 1110 may generate a user interface element corresponding to the context information. The user interface element may welcome the visitor and direct the visitor to the location of their assigned parking space (e.g., provide turn-by-turn directions to the location of the parking space, etc.).

As another example, the identified person(s) may be group of visitors for a meeting with an employee of the building 10. The group of visitors may be pre-registered with the building management system 102 (e.g., by the employee which they are visiting). The group of visitors may be pre-registered by the employee providing information corresponding to the meeting (e.g., meeting location and time, for instance) and an image of at least one of the members of the group of visitors to an employee portal for the building management system 102 (e.g., on a client device for the employee). When the group of visitors enter the building 10 near the digital signage 1102, the identification sensor(s) 1120 may generate data corresponding to the group of visitors (e.g., capture an image including the faces of the group of visitors). The viewer identifier 1118 may receive the image from the identification sensor(s) 1120. The viewer identifier 1118 may identify the at least one member of the group of visitors based on the image by cross-referencing identified features of the at least one member with data in the database (including the image provided by the employee via the employee portal). For example, the viewer identifier 1118 may query entity graph 170 to identify a digital twin having the identified features (e.g., a node corresponding to the features, etc.) and determine an identity of the at least one member based on the identified digital twin. The interface manager 1110 may extract the meeting location from the meeting information provided by the employee. The interface manager 1110 may generate a user interface element corresponding to the meeting information. The user interface element may welcome the group of visitors and direct the group to the location of the meeting.

As another example, the identified person(s) may be an employee of the building 10. When the employee enters the building near the digital signage 1102, the identification sensor(s) 1120 may generate data corresponding to the group of visitors (e.g., receive a scan of the employee's badge). The viewer identifier 1118 may receive data from the identification sensor(s) 1120 (e.g., identification data corresponding to the employee's badge). The viewer identifier 1118 may identify the employee by cross-referencing the identification data with data in an employee database (including various identification data). The interface manager 1110 may extract the employee's calendar and determine that the employee has a meeting (based on the employee's calendar). For example, the interface manager 1110 may retrieve the employee's calendar from a digital twin associated with the employee (e.g., a calendar associated with the individual through an "isLinked" connection, etc.). The interface manager 1110 may generate a user interface element corresponding to the meeting information contained in the employee's calendar. The user interface element may remind the employee of their meeting and direct the employee to the location of the meeting.

As another example, the identified person(s) may be a very important person (VIP). When the VIP enters the building near the digital signage 1102, the identification sensor(s) 1120 may generate data corresponding to the VIP (e.g., receive a scan of the VIP's face, etc.). The viewer identifier 1118 may receive data from the identification sensor(s) 1120 (e.g., identification data corresponding to the VIP's face, etc.). The view identifier 1118 may identify the VIP by cross-referencing the identification data with data in an employee database (including various identification data). For example, the viewer identifier 1118 may query a database having digital twins to identify the VIP (e.g., by identifying a digital twin including the identification data in a linked identifier entity, etc). The interface manager 1110 may extract the VIP's employee calendar and determine that the VIP has a block of upcoming meetings (based on the calendar, context information, etc.). The interface manager 1110 may generate a user interface element suggesting the VIP get something to eat before the block of upcoming meetings. The user interface element may remind the VIP of their meetings and direct the VIP to a location to purchase food.

As yet another example, the identified person(s) may be an unregistered visitor of the building 10. The viewer identifier 1118 may identify the person as an unregistered visitor by determining that the visitor does not have any information in any databases (e.g., has never visited the building 10 before, is not an employee, etc.). When the unregistered visitor enters the building near the digital signage 1102, the identification sensor(s) 1120 may generate data corresponding to the visitor (e.g., capture an image of the visitor's face). The viewer identifier 1118 may receive data from the identification sensor(s) 1120 (e.g., the image). The viewer identifier 1118 may cross-reference identified features of the visitor's face with a database including entries corresponding to various registered visitors/employees. For example, the viewer identifier 1118 may identify a digital twin including the identified features (e.g., a digital twin having linked entities including the identified features such as through a "hasFace" connection, etc.). The viewer identifier 1118 may identify the visitor as an unregistered visitor responsive to determining the features do not sufficiently match any entries (e.g., outside of a threshold, no exact match, etc.). The interface manager 1110 may generate a user interface element corresponding to unregistered visitors. The user interface element may welcome the visitor generically and direct the visitor to the location of the bathrooms, lobby, etc.

The memory 1108 may include a signage controller 1122. The signage controller 1122 may be an application designed or implemented for controlling the digital signage 1102 to display various user interface elements. The signage controller 1122 may be configured to transmit user interface elements to the digital signage 1102 for displaying to viewers. The signage controller 1122 may be configured to transmit the user interface elements across the network to the digital signage 1102. The digital signage 1102 may be configured to receive the user interface elements. The digital signage 1102 may display the user interface elements. As the interface manager 1110 generates new user interface elements, the signage controller 1122 may be configured to provide the new user interface elements to the digital signage 1102. As such, the digital signage 1102 may be updated or refreshed with new information and data. Additionally or alternatively, the digital signage controller 1122 may be configured to receive user input from the digital signage 1102.

In some embodiments, the signage controller 1122 may be configured to transmit user interface elements according to a priority. The interface manager 1110 may be configured to assign a priority to each user interface element. The interface manager 1110 may be configured to assign the priority based on the type of information contained in the user interface element. The interface manager 1110 may be configured to assign a high priority to emergency user interface elements, a medium priority to user interface elements corresponding to identified viewers of the digital signage 1102, and a low priority to default or static user interface elements. Where multiple viewers are identified by the viewer identifier 1120, the interface manager 1110 may assign a priority based on which viewers are identified first. For instance, as a first viewer enters the building 10 and approaches the digital signage 1102 and, subsequently, a second viewer enters the building 10 and approaches the digital signage 1102, the interface manager 1110 may assign a higher priority to the user interface element corresponding to the first viewer than the user interface element corresponding to the second viewer.

The signage controller 1122 may be configured to control the digital signage 1102 in accordance with the priority from the user interface elements generated by the interface manager 1110. The signage controller 1122 may be configured to control the digital signage 1102 to display the highest priority user interface elements generated by the interface manager 1110. The digital signage 1102 may receive the user interface elements from the signage controller 1122 and display the user interface elements to viewers of the digital signage 1102 upon receipt from the signage controller 1122.

Figure 5:
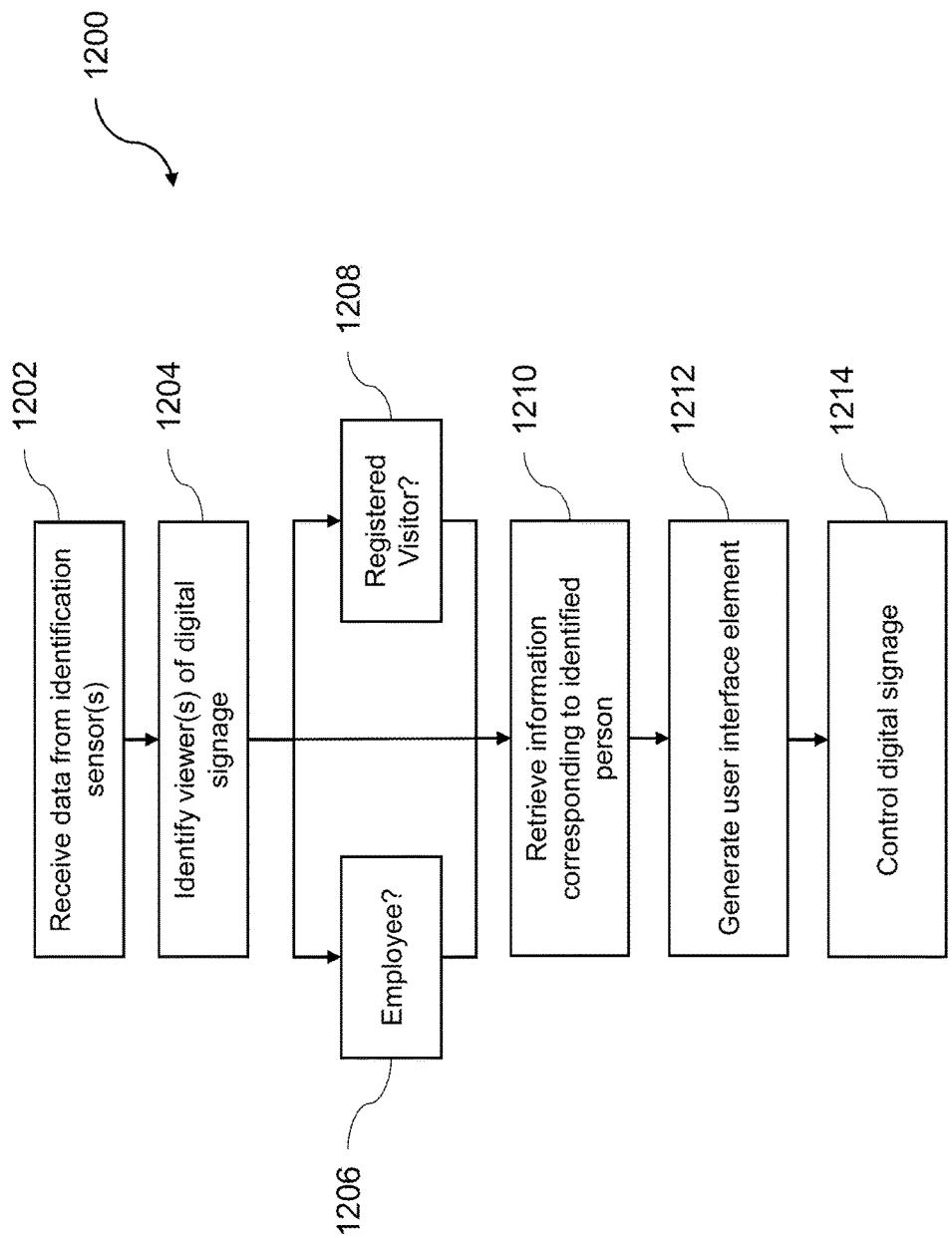
FIG. 5 is a flowchart showing a method for managing content delivered to a smart display in a building, according to an exemplary embodiment.

Now that various aspects of the system 1100 have been described, an example method for managing content delivered to a smart display in a building is described. Specifically, FIG. 5 depicts a flowchart showing a method 1200 for managing content delivered to a smart display in a building, according to an exemplary embodiment. The steps and operations of the method 1200 described with reference to FIG. 5 may be performed by or via the devices, components and elements described above. However, the method 1200 is not specifically limited to these devices, components, and elements.

At step 1202, the building management system 102 receives data from the identification sensor(s). The identification sensor(s) may be arranged to capture identification information corresponding to viewers of digital signage 1102. The digital signage 1102 may be located or otherwise positioned in various locations within a building 10. For instance, the digital signage 1102 may be positioned in the lobby of the building 10, along various hallways, etc. The identification sensor(s) 1120 may be or include cameras, biometric sensors, badge or card scanners, etc. The identification information may thus include image data, biometric information, badge data, etc. The identification sensor(s) 1120 may be configured to generate the identification information when a person is in proximity to the digital signage 1102 (e.g., approaching the digital signage 1102, enters the space where the digital signage 1102 is located, etc.). The identification sensor(s) 1120 may provide the identification information to the building management system 102.

At step 1204, the building management system 102 identifies viewers of the digital signage 1102. The building management system 102 may identify the viewers of the digital signage 1102 based on data from the identification sensor(s) 1120 (e.g., received at step 1202). The building management system 102 may cross-reference the identification information received from the identification sensor(s) 1120 with a database including information pertaining to registered persons. The database may include entries including identification information (e.g., facial or biometric features, badge information, etc.), and a corresponding identity. The building management system 102 may identify person(s) viewing the digital signage 1102 based on the cross-referencing of the identification information with the entries in the database.

At step 1206 and step 1208, the building management system 102 determines whether the viewers of the digital signage are employee(s) (step 1206) or registered visitor(s) (step 1208). Additionally or alternatively, building management system 102 may determine other characteristics of the viewers. For example, building management system 102 may retrieve information corresponding to the identified person (e.g., step 1210) and determine from the retrieved information an organization role of the viewer (e.g., a position, a title, a seniority, etc.). In some embodiments, building management system 102 receives information from identification sensor(s) 1120. Additionally or alternatively, building management system 102 may receive information from external input devices and/or external data streams (e.g., such as a publication/subscribe model, etc.). The database may include information corresponding to employees (e.g., each entry may flag viewers as employees or registered visitors). The registered visitors may be registered by employees. The employees may register visitors by providing identification information (e.g., images of the registered visitors, a temporary badge number, etc.) corresponding to the registered visitors to an employee portal via the employee's client device. The building management system 102 may identify person(s) as employees, registered visitors, and unregistered visitors following cross-referencing the database. The building management system 102 may identify persons as unregistered visitors responsive to identifying that the person is not an employee or registered visitors.

At step 1210, the building management system 102 retrieves information corresponding to the identified person. In some embodiments, step 1210 includes retrieving context information associated with the identified person. The information may be or include, for instance, access information corresponding to the identified person's access within the building 10, meeting information or schedules, etc. The information may be incorporated into the database including identification information, or the information may be incorporated into a separate database. In either embodiment, the building management system 102 may cross-reference the person identified at step 1204 with the database to retrieve information corresponding to the identified person. Where the identified person is a registered visitor or employee, the retrieved information may be personalized according to the identified person. Where the identified person is an unregistered visitor, the retrieved information may be generic to all unregistered visitors. In various embodiments, retrieving context information includes traversing a digital twin associated with the identified person. In some embodiments, building management system 102 may retrieve a digital twin associated with the identified person, determine a title of the identified person (e.g., from a "isAKindOf" relationship, etc.), determine a schedule of the identified person (e.g., from an "owns" relationship, etc.), and determine an office location of the individual (e.g., from an "owns" relationship and a "isLocated" relationship, etc.).

At step 1212, the building management system 102 generates a user interface element. In some embodiments, the building management system 102 generates a user interface element for the digital signage 1102 based on the identified person (e.g., identified at step 1204). The user interface element may include the information corresponding to the identified person (retrieved at operation 1210). In various embodiments, the building management system 102 identifies a purpose of the identified person based on the retrieved information. For example, the building management system 102 may determine that the identified person has an upcoming meeting (e.g., based on a schedule of the identified person included in the retrieved information) and thereby determine that the purpose of the individual is to go to the upcoming meeting. In various embodiments, the purpose may include elements. For example, a purpose of "attend upcoming meeting" may include elements: (i) park at assigned parking space, (ii) get food, and (iii) navigate through building to conference room. The user interface element may include information which is personalized according to the identified person. The user interface element may include the identified person's name, meeting information (e.g., time, location, who they are meeting with, etc.). In various embodiments, the user interface element is interactable. For example, the user interface element may be a food menu that may facilitate a user to make a number of food selections. As a non-limiting example, the building management system 102 may generate a user interface element including a victuals menu for display on the digital signage 1102. In response to receiving a user selection of desired victuals items, the building management system 102 may be configured to order the selected victuals items (e.g., for delivery to a location associated with the individual such as a location of the digital signage 1102 or a location of a meeting of the individual, etc.).

In some embodiments, the building management system 102 may receive data corresponding to settings for the digital signage 1102. The building management system 102 may receive the data via the interface manager 1110 of the building management system 102. An administrator of the building management system 102 may provide settings to the building management system 102 via the admin client device 1112. The settings may be or include settings corresponding to pre-defined content, a duration in which content is displayed (e.g., on the digital signage 1102), a schedule for content, a format of content, etc. The building management system 102 may generate the user interface element in accordance with the settings received via the interface manager 1110.

At step 1214, the building management system 102 controls the digital signage 1102. In some embodiments, the building management system 102 controls the digital signage 1102 to display the user interface element in accordance with the received data (e.g., retrieved at step 1210). Hence, the user interface element may be displayed such that the person viewing the digital signage 102 may view information relevant to the particular person. Where the person is identified as a registered visitor or employee, the information may be personalized to the particular person. Where the person is identified as an unregistered visitor, the information may be generically relevant to all unregistered visitors.

Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements can be reversed or otherwise varied and the nature or number of discrete elements or positions can be altered or varied. Accordingly, all such modifications are intended to be included within the scope of the present disclosure. The order or sequence of any process or method steps can be varied or re-sequenced according to alternative embodiments. Other substitutions, modifications, changes, and omissions can be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure can be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps can be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a mobile telephone, a personal digital assistant (PDA), a mobile audio or video player, a game console, a Global Positioning System (GPS) receiver, or a portable storage device (e.g., a universal serial bus (USB) flash drive), etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry. The term processing circuit as used herein may include hardware, software, or a combination thereof. For example, a processing circuit may include a processor and memory having instruction stored thereon that, when executed by the processor, cause the processor to perform the operations described herein.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user and a keyboard, a pointing device, e.g., a mouse, trackball, etc., or a touch screen, touch pad, etc.) by which the user may provide input to the computer. Other kinds of devices may be used to provide for interaction with a user as well; for example, feedback provided to the user may be any form of sensory feedback (e.g., visual feedback, auditory feedback, or tactile feedback), and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

The present disclosure may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated. Further, features or aspects within each example embodiment should typically be considered as available for other similar features or aspects in other example embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

What is claimed is:

1. One or more non-transitory computer-readable storage mediums having instructions stored thereon that, when executed by one or more processors, cause the one or more processors to:
receive identifying information associated with an individual;
query a database to retrieve context information corresponding to the individual, the database comprising (i) a plurality of entities: corresponding to two or more of spaces, equipment, people, or events and (ii) a plurality of relationships between the entities, the context information determined based on the entities and relationships of the database;
determine a purpose of the individual based on the context information;
dynamically generate a user interface element for a display based on the purpose of the individual; and
control the display to display the user interface element.

2. The one or more non-transitory computer-readable storage media of claim 1, wherein the context information includes a schedule having events associated with the individual, wherein the purpose of the individual is a next event on the schedule of the individual, and wherein the one or more processors generate the user interface element based on a location of the display and a location of the next event on the schedule of events.

3. The one or more non-transitory computer-readable storage media of claim 1, wherein the context information includes historical information describing patterns of activity associated with the individual, and wherein the one or more processors generate the user interface element based on the patterns of activity associated with the individual.

4. The one or more non-transitory computer-readable storage media of claim 1, wherein the context information includes an organizational role associated with the individual, and wherein the one or more processors generate the user interface element based on the organizational role associated with the individual.

5. The one or more non-transitory computer-readable storage media of claim 1, wherein the context information includes a visitor indicator indicating that the individual is a visitor to a building of the one or more buildings, and wherein the one or more processors generate the user interface element based on the visitor indicator, and wherein the user interface element includes a greeting for the individual.

6. The one or more non-transitory computer-readable storage media of claim 1, wherein the context information includes a parking space associated with the individual, and wherein the user interface element includes directions to the parking space.

7. The one or more non-transitory computer-readable storage media of claim 1, wherein the identifying information is received from a sensor, and wherein the identifying information is at least one of biometric data, card data, or alphanumeric data.

8. The one or more non-transitory computer-readable storage media of claim 7, wherein the identifying information includes the biometric data and the alphanumeric data and wherein the biometric data includes facial recognition data or voice recognition data, and wherein the alphanumeric data includes badge scan data.

9. The one or more non-transitory computer-readable storage media of claim 1, wherein the context information includes transportation information, and wherein the user interface element includes at least one of a public transportation schedule or directions to a transportation pickup location.

10. The one or more non-transitory computer-readable storage media of claim 1, wherein the context information includes privacy settings, and wherein the one or more processors generate the user interface element based on the privacy settings.

11. A method for controlling digital signage, the method comprising:
receiving identifying information associated with an individual;
querying a database to retrieve context information corresponding to the individual, the database comprising (i) a plurality of entities: corresponding to two or more of spaces, equipment, people, or events and (ii) a plurality of relationships between the entities, the context information determined based on the entities and relationships of the database;
determining a purpose of the individual based on the context information;
dynamically generating a user interface element for a display based on the purpose of the individual; and
controlling the display to display the user interface element.

12. The method of claim 11, wherein the context information includes a schedule having events associated with the individual, wherein the purpose of the individual is a next event on the schedule of the individual, and wherein the user interface element is generated based on a location of the display and a location of the next event on the schedule of events.

13. The method of claim 11, wherein the context information includes historical information describing patterns of activity associated with the individual, and where the user interface element is generated based on the patterns of activity associated with the individual.

14. The method of claim 11, wherein the context information includes an organizational role associated with the individual, and wherein the user interface element is generated based on the organizational role associated with the individual.

15. The method of claim 11, wherein the context information includes a visitor indicator indicating that the individual is a visitor to a building associated with the digital signage, wherein the user interface element is generated based on the visitor indicator, and wherein the user interface element includes a greeting for the individual.

16. The method of claim 11, wherein the context information includes a parking space associated with the individual, and wherein the user interface element includes directions to the parking space.

17. The method of claim 11, wherein the identifying information is received from a sensor, and wherein the identifying information is at least one of biometric data, card data, or alphanumeric data.

18. The method of claim 17, wherein the identifying information includes the biometric data and the alphanumeric data and wherein the biometric data includes facial recognition data or voice recognition data, and wherein the alphanumeric data includes badge scan data.

19. The method of claim 11, wherein the context information includes transportation information, and wherein the user interface element includes at least one of a public transportation schedule or directions to a transportation pickup location.

20. A digital signage system for one or more buildings, the digital signage system comprising one or more processing circuits and one or more computer readable storage media, the one or more computer readable storage media having instructions stored thereon that, when executed by the one or more processing circuits, cause the one or more processing circuits to:

receive, from a sensor, identifying information associated with an individual;

query a database to retrieve context information corresponding to the individual, the database comprising (i) a plurality of entities: corresponding to two or more of spaces, equipment, people, or events and (ii) a plurality of relationships between the entities, the context information determined based on the entities and relationships of the database;

determine a purpose of the individual based on the context information;

dynamically generate a user interface element for a display based on the purpose of the individual; and control the display to display the user interface element.

* * * * *